US012684134B2

(12) United States Patent
Park et al.

(10) Patent No.: US 12,684,134 B2
(45) Date of Patent: Jul. 14, 2026

(54) IMAGE ENCODING/DECODING METHOD AND APPARATUS, AND RECORDING MEDIUM STORING BITSTREAM

(71) Applicant: LG Electronics Inc., Seoul (KR)

(72) Inventors: Naeri Park, Seoul (KR); Jaehyun Lim, Seoul (KR); Sunmi Yoo, Seoul (KR); Junghak Nam, Seoul (KR); Hyeongmoon Jang, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/695,237

(22) PCT Filed: Sep. 29, 2022

(86) PCT No.: PCT/KR2022/014698
§ 371 (c)(1),
(2) Date: Mar. 25, 2024

(87) PCT Pub. No.: WO2023/055149
PCT Pub. Date: Apr. 6, 2023

(65) Prior Publication Data
US 2025/0159198 A1 May 15, 2025

(30) Foreign Application Priority Data
Sep. 29, 2021 (KR) ........................ 10-2021-0129003

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/137* (2014.11); *H04N 19/176* (2014.11)

(58) Field of Classification Search
None
See application file for complete search history.

(56) References Cited

U.S. PATENT DOCUMENTS

| 10,218,998 B2* | 2/2019 | Lee ........................ H04N 19/56 |
| 10,863,189 B2* | 12/2020 | Wennersten ......... H04N 19/184 |

(Continued)

FOREIGN PATENT DOCUMENTS

| KR | 10-2020-0081460 | 7/2020 |
| KR | 10-2021-0052566 | 5/2021 |

OTHER PUBLICATIONS

International Search Report and Written Opinion in Appln. No. PCT/KR2022/014698, mailed on Dec. 27, 2022, 6 pages (with English translation).

(Continued)

*Primary Examiner* — Mohammad J Rahman
(74) *Attorney, Agent, or Firm* — Fish & Richardson P.C.

(57) ABSTRACT

An image decoding/encoding method and apparatus according to the present disclosure may: generate a candidate list for predicting a first motion vector of a current block; derive a control point vector of the current block on the basis of a candidate index of the current block and the candidate list; correct the control point vector of the current block on the basis of a predetermined delta motion vector; derive the first motion vector of the current block on the basis of the corrected control point vector; and perform inter prediction on the current block by using the first motion vector of the current block.

15 Claims, 12 Drawing Sheets

(51) Int. Cl.
    *H04N 19/137* (2014.01)
    *H04N 19/176* (2014.01)

(56) References Cited

U.S. PATENT DOCUMENTS

| | | | | |
|---|---|---|---|---|
| 11,039,157 B2 * | 6/2021 | Li | ........................ | H04N 19/52 |
| 11,582,460 B2 * | 2/2023 | Wang | .................. | H04N 19/176 |
| 2019/0098331 A1 * | 3/2019 | Wennersten | ......... | H04N 19/159 |
| 2020/0120335 A1 | 4/2020 | Hung et al. | | |
| 2020/0221120 A1 | 7/2020 | Robert et al. | | |
| 2020/0404253 A1 | 12/2020 | Chen et al. | | |
| 2021/0112254 A1 * | 4/2021 | Ahn | .................... | H04N 19/105 |
| 2021/0235105 A1 | 7/2021 | Chen et al. | | |
| 2021/0274208 A1 | 9/2021 | Zhang et al. | | |
| 2021/0344951 A1 * | 11/2021 | Ahn | .................... | H04N 19/119 |
| 2022/0014782 A1 * | 1/2022 | Chon | .................. | H04N 19/176 |
| 2022/0070456 A1 * | 3/2022 | Chiang | ................ | H04N 19/119 |
| 2022/0103815 A1 * | 3/2022 | Zhang | .................... | H04N 19/70 |
| 2022/0224913 A1 * | 7/2022 | Wang | .................. | H04N 19/593 |

OTHER PUBLICATIONS

Browne et al., "Algorithm description for Versatile Video Coding and Test Model 14 (VTM 14)," Joint Video Experts Team (JVET) of ITU-T SG 16 WP 3 and ISO/IEC JTC 1/SC 29, 23rd Meeting, by teleconference, JVET-W2002-v1, Jul. 2021, 105 pages.

Extended European Search Report in European Appln. No. 22876921. 2, mailed on Aug. 11, 2025, 12 pages.

Li et al., "CE4-related: affine merge mode with prediction offsets," Joint Video Experts Team (JVET) of ITU-T SG 16 WP 3 and ISO/IEC JTC 1/SC 29/WG 11, 12th Meeting: Macao, China, JVET-L0320, Oct. 2018, 6 pages.

* cited by examiner

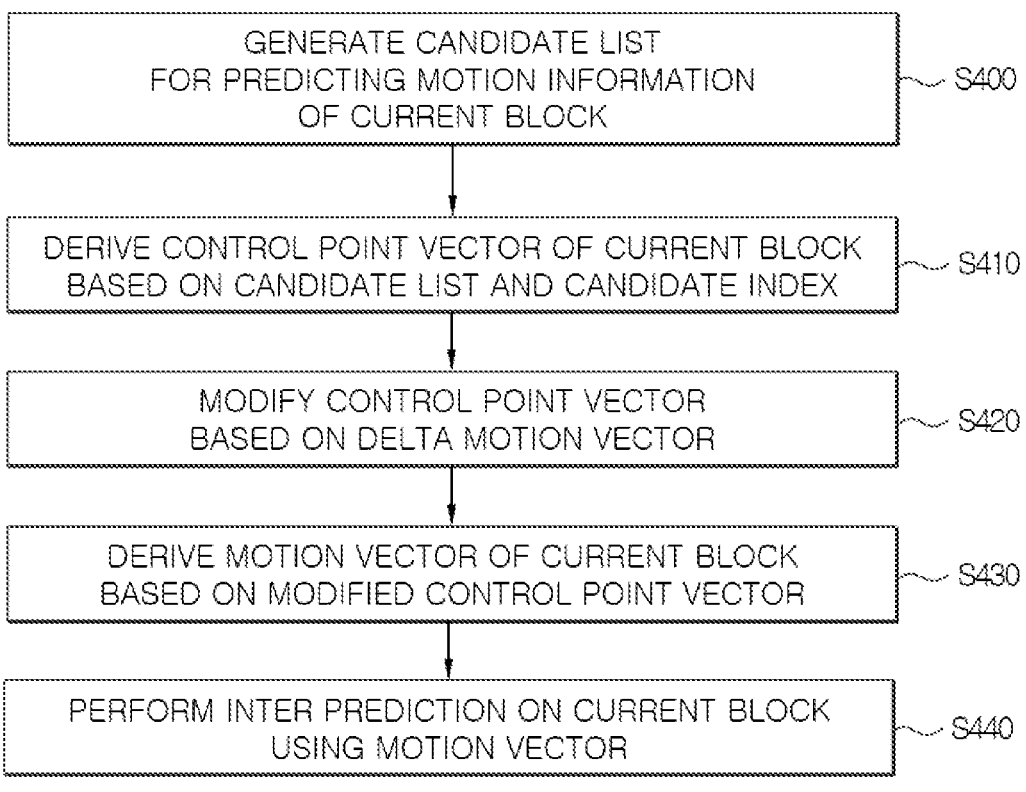

GENERATE CANDIDATE LIST
FOR PREDICTING MOTION INFORMATION
OF CURRENT BLOCK — S400

DERIVE CONTROL POINT VECTOR OF CURRENT BLOCK
BASED ON CANDIDATE LIST AND CANDIDATE INDEX — S410

MODIFY CONTROL POINT VECTOR
BASED ON DELTA MOTION VECTOR — S420

DERIVE MOTION VECTOR OF CURRENT BLOCK
BASED ON MODIFIED CONTROL POINT VECTOR — S430

PERFORM INTER PREDICTION ON CURRENT BLOCK
USING MOTION VECTOR — S440

FIG. 10

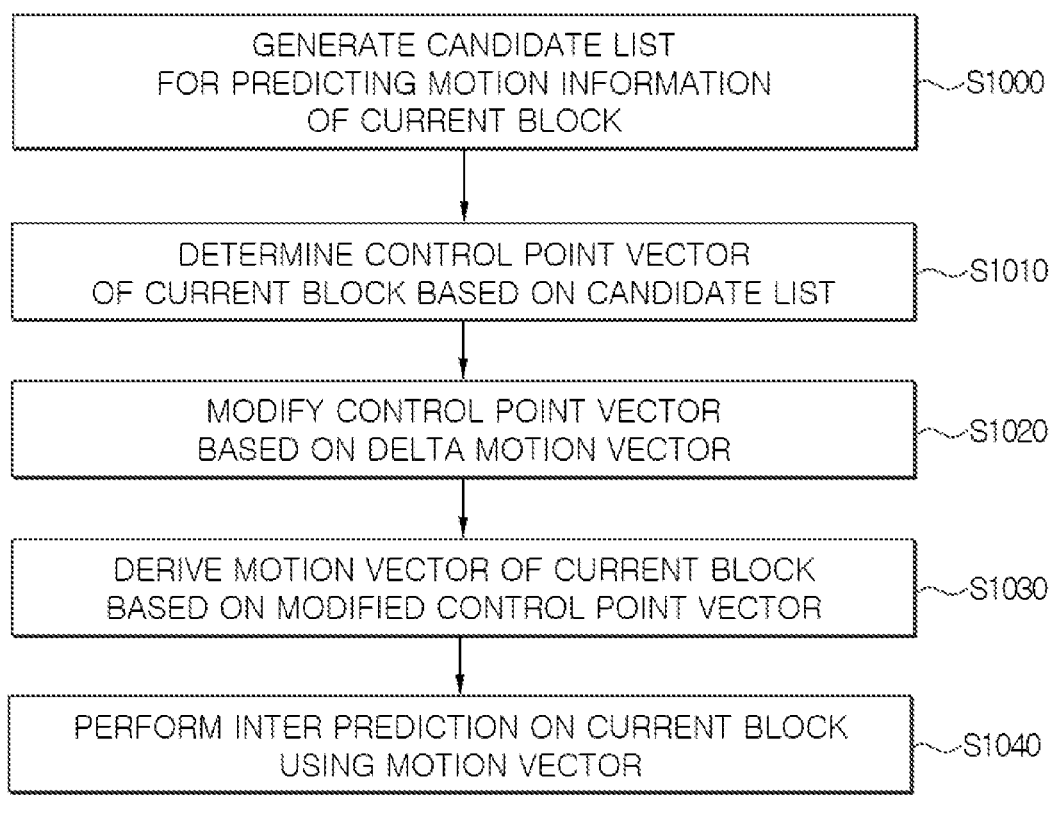

GENERATE CANDIDATE LIST
FOR PREDICTING MOTION INFORMATION
OF CURRENT BLOCK    ~S1000

DETERMINE CONTROL POINT VECTOR
OF CURRENT BLOCK BASED ON CANDIDATE LIST    ~S1010

MODIFY CONTROL POINT VECTOR
BASED ON DELTA MOTION VECTOR    ~S1020

DERIVE MOTION VECTOR OF CURRENT BLOCK
BASED ON MODIFIED CONTROL POINT VECTOR    ~S1030

PERFORM INTER PREDICTION ON CURRENT BLOCK
USING MOTION VECTOR    ~S1040

IMAGE ENCODING/DECODING METHOD AND APPARATUS, AND RECORDING MEDIUM STORING BITSTREAM

CROSS-REFERENCE TO RELATED APPLICATIONS

This application is a National Stage application under 35 U.S.C. § 371 of International Application No. PCT/KR2022/014698, filed on Sep. 29, 2022, which claims the benefit of Korean Application No. 10-2021-0129003, filed on Sep. 29, 2021. The disclosures of the prior applications are incorporated by reference in their entirety.

TECHNICAL FIELD

The present disclosure relates to an image encoding/decoding method and apparatus, and a recording medium storing a bitstream.

BACKGROUND

Recently, the demand for high-resolution and high-quality images such as HD (High Definition) images and UHD (Ultra High Definition) images has been increasing in various application fields, and accordingly, highly efficient image compression technologies are being discussed.

There are a variety of technologies such as inter-prediction technology that predicts a pixel value included in a current picture from a picture before or after a current picture with video compression technology, intra-prediction technology that predicts a pixel value included in a current picture by using pixel information in a current picture, entropy coding technology that allocates a short sign to a value with high appearance frequency and a long sign to a value with low appearance frequency, etc. and these image compression technologies may be used to effectively compress image data and transmit or store it.

SUMMARY

The present disclosure seeks to provide a method and apparatus for modifying the control point vector or motion vector of a block encoded in an affine mode.

The present disclosure seeks to provide a method and apparatus for adaptively performing modification of a control point vector or motion vector of a block encoded in an affine mode.

The present disclosure seeks to provide a method and apparatus for signaling information related to modification of a control point vector or motion vector.

The image decoding method and apparatus according to the present disclosure may generate a candidate list for predicting a first motion vector of a current block, derive a control point vector of the current block based on a candidate index of the current block and the candidate list, modify the control point vector of the current block based on a predetermined delta motion vector, derive a first motion vector of the current block based on the modified control point vector, and perform inter prediction on the current block using the first motion vector of the current block.

In the image decoding method and apparatus according to the present disclosure, the control point vector may include at least one of a first control point vector corresponding to a top-left corner position of the current block, a second control point vector corresponding to a top-right corner position of the current block, a third control point vector corresponding to a bottom-left corner position of the current block, or a fourth control point vector corresponding to a bottom-right corner position of the current block.

In the image decoding method and apparatus according to the present disclosure, modifying the control point vector of the current block may comprise determining a search range for modification of the control point vector, determining an SAD (sum of absolute difference) array based on the search range, and determining the delta motion vector based on a plurality of SADs belonging to the SAD array.

In the image decoding method and apparatus according to the present disclosure, determining the SAD array may comprise deriving a modified control point vector by applying a predetermined offset to one of the control point vectors of the current block, deriving a second motion vector in units of subblocks of the current block based on the modified control point vector and the other of the control point vectors, and calculating SAD between an L0 block and an L1 block specified based on the derived second motion vector.

In the image decoding method and apparatus according to the present disclosure, the L0 block and the L1 block may be composed of L0 subblocks and L1 subblocks corresponding to the subblocks belonging to the current block, respectively.

In the image decoding method and apparatus according to the present disclosure, the L0 block and the L1 block may be specified based on the subblock corresponding to the position of the modified control point vector among subblocks in the current block.

In the image decoding method and apparatus according to the present disclosure, the L0 block and the L1 block may be specified based on a subblock corresponding to the position of the modified control point vector and at least one neighboring subblock adjacent to the subblock among subblocks in the current block.

In the image decoding method and apparatus according to the present disclosure, determining the SAD array may comprise deriving a modified control point vector by applying a predetermined offset to one of the control point vectors of the current block and calculating SAD between an L0 block and an L1 block specified based on the modified control point vector.

In the image decoding method and apparatus according to the present disclosure, determining the SAD array may comprise deriving a motion vector of the current block based on the control point vector of the current block, deriving a modified motion vector by applying a predetermined offset to the motion vector of the current block, and calculating SAD between an L0 block and an L1 block specified based on the modified motion vector.

In the image decoding method and apparatus according to the present disclosure, the modification of the control point vector may be adaptively performed by considering the type of the candidate indicated by the candidate index among a plurality of candidates belonging to the candidate list.

In the image decoding method and apparatus according to the present disclosure, the modification of the control point vector may be adaptively performed based on at least one of a first flag indicating whether the modification is allowed for the control point vector of the block encoded in the affine mode or a second flag indicating whether the modification is applied for the control point vector.

In the image decoding method and apparatus according to the present disclosure, the control point vector to be modified among the control point vectors of the current block may be determined based on at least one of the position of a neighboring block coded in the affine mode or the type of the affine model of the current block.

In the image decoding method and apparatus according to the present disclosure, one of the control point vectors of the current block may share the same delta motion vector with another one of the control point vectors of the current block.

In the image decoding method and apparatus according to the present disclosure, the type of the affine model for the current block may be changed based on the number of modified control point vectors.

The image decoding method and apparatus according to the present disclosure may generate a candidate list for predicting a first motion vector of the current block, determine a control point vector of the current block based on the candidate list, modify the control point vector of the current block based on a predetermined delta motion vector, derive the first motion vector of the current block based on the modified control point vector, and perform inter prediction on the current block using the first motion vector of the current block.

A computer-readable digital storage medium storing encoded video/image information that causes performing the image decoding method by a decoding apparatus according to the present disclosure is provided.

A computer-readable digital storage medium storing video/image information generated according to the image encoding method according to the present disclosure is provided.

According to the present disclosure, the accuracy of inter prediction may be improved by modifying the control point vector or motion vector of a block coded in the affine mode.

According to the present disclosure, by adaptively performing modification of the control point vector or motion vector of a block coded in the affine mode, the complexity of computation may be reduced and the efficiency of image coding may be improved.

According to the present disclosure, information related to modification of the control point vector or motion vector may be efficiently signaled.

BRIEF DESCRIPTION OF THE DRAWINGS

FIG. 3 shows a schematic block diagram of a decoding apparatus to which an embodiment of the present disclosure is applicable and decoding of video/image signals is performed.

FIG. 4 shows an affine model-based inter prediction method performed by a decoding apparatus as an embodiment according to the present disclosure.

FIG. 10 shows an affine model-based inter prediction method performed by an encoding apparatus as an embodiment according to the present disclosure.

DETAILED DESCRIPTION

Figure 1:
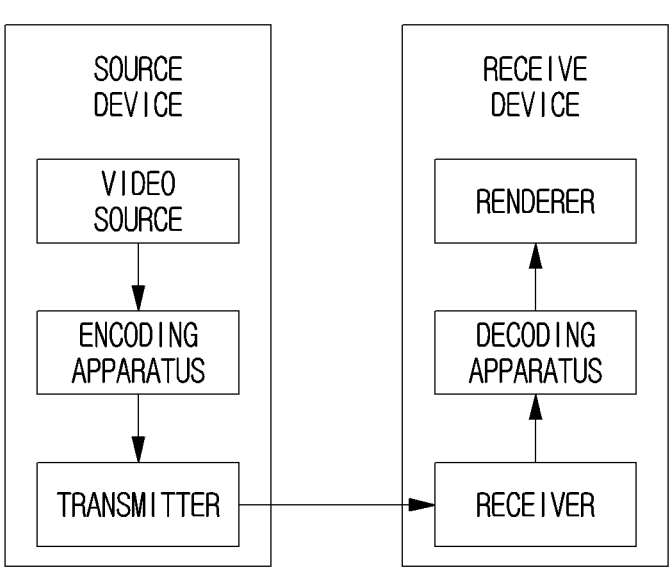
FIG. 1 shows a video/image coding system according to the present disclosure.

Since the present disclosure may make various changes and have several embodiments, specific embodiments will be illustrated in a drawing and described in detail in a detailed description. However, it is not intended to limit the present disclosure to a specific embodiment, and should be understood to include all changes, equivalents and substitutes included in the spirit and technical scope of the present disclosure. While describing each drawing, similar reference numerals are used for similar components.

A term such as first, second, etc. may be used to describe various components, but the components should not be limited by the terms. The terms are used only to distinguish one component from other components. For example, a first component may be referred to as a second component without departing from the scope of a right of the present disclosure, and similarly, a second component may also be referred to as a first component. A term of and/or includes any of a plurality of related stated items or a combination of a plurality of related stated items.

When a component is referred to as "being connected" or "being linked" to another component, it should be understood that it may be directly connected or linked to another component, but another component may exist in the middle. On the other hand, when a component is referred to as "being directly connected" or "being directly linked" to another component, it should be understood that there is no another component in the middle.

A term used in this application is just used to describe a specific embodiment, and is not intended to limit the present disclosure. Singular expressions include plural expressions unless the context clearly dictates otherwise. In this application, it should be understood that a term such as "include" or "have", etc. is intended to designate the presence of features, numbers, steps, operations, components, parts or combinations thereof described in the specification, but does not exclude in advance the possibility of presence or addition of one or more other features, numbers, steps, operations, components, parts or combinations thereof.

The present disclosure relates to video/image coding. For example, a method/an embodiment disclosed herein may be applied to a method disclosed in the versatile video coding (VVC) standard. In addition, a method/an embodiment disclosed herein may be applied to a method disclosed in the essential video coding (EVC) standard, the AOMedia Video 1 (AV1) standard, the 2nd generation of audio video coding standard (AVS2) or the next-generation video/image coding standard (ex. H.267 or H.268, etc.).

This specification proposes various embodiments of video/image coding, and unless otherwise specified, the embodiments may be performed in combination with each other.

Herein, a video may refer to a set of a series of images over time. A picture generally refers to a unit representing one image in a specific time period, and a slice/a tile is a unit that forms part of a picture in coding. A slice/a tile may include at least one coding tree unit (CTU). One picture may consist of at least one slice/tile. One tile is a rectangular area composed of a plurality of CTUs within a specific tile column and a specific tile row of one picture. A tile column is a rectangular area of CTUs having the same height as that of a picture and a width designated by a syntax requirement of a picture parameter set. A tile row is a rectangular area of CTUs having a height designated by a picture parameter set and the same width as that of a picture. CTUs within one tile may be arranged consecutively according to CTU raster scan, while tiles within one picture may be arranged consecutively according to raster scan of a tile. One slice may include an integer number of complete tiles or an integer number of consecutive complete CTU rows within a tile of a picture that may be included exclusively in a single NAL unit. Meanwhile, one picture may be divided into at least two sub-pictures. A sub-picture may be a rectangular area of at least one slice within a picture.

A pixel, a pixel or a pel may refer to the minimum unit that constitutes one picture (or image). In addition, 'sample' may be used as a term corresponding to a pixel. A sample may generally represent a pixel or a pixel value, and may represent only a pixel/a pixel value of a luma component, or only a pixel/a pixel value of a chroma component.

A unit may represent a basic unit of image processing. A unit may include at least one of a specific area of a picture and information related to a corresponding area. One unit may include one luma block and two chroma (ex. cb, cr) blocks. In some cases, a unit may be used interchangeably with a term such as a block or an area, etc. In a general case, a M×N block may include a set (or an array) of transform coefficients or samples (or sample arrays) consisting of M columns and N rows.

Herein, "A or B" may refer to "only A", "only B" or "both A and B." In other words, herein, "A or B" may be interpreted as "A and/or B." For example, herein, "A, B or C" may refer to "only A", "only B", "only C" or "any combination of A, B and C)".

A slash (/) or a comma used herein may refer to "and/or." For example, "A/B" may refer to "A and/or B." Accordingly, "A/B" may refer to "only A", "only B" or "both A and B." For example, "A, B, C" may refer to "A, B, or C".

Herein, "at least one of A and B" may refer to "only A", "only B" or "both A and B". In addition, herein, an expression such as "at least one of A or B" or "at least one of A and/or B" may be interpreted in the same way as "at least one of A and B".

In addition, herein, "at least one of A, B and C" may refer to "only A", "only B", "only C", or "any combination of A, B and C". In addition, "at least one of A, B or C" or "at least one of A, B and/or C" may refer to "at least one of A, B and C".

In addition, a parenthesis used herein may refer to "for example." Specifically, when indicated as "prediction (intra prediction)", "intra prediction" may be proposed as an example of "prediction". In other words, "prediction" herein is not limited to "intra prediction" and "intra prediction" may be proposed as an example of "prediction." In addition, even when indicated as "prediction (i.e., intra prediction)", "intra prediction" may be proposed as an example of "prediction."

Herein, a technical feature described individually in one drawing may be implemented individually or simultaneously.

FIG. 1 shows a video/image coding system according to the present disclosure.

Referring to FIG. 1, a video/image coding system may include a first device (a source device) and a second device (a receiving device).

A source device may transmit encoded video/image information or data in a form of a file or streaming to a receiving device through a digital storage medium or a network. The source device may include a video source, an encoding apparatus and a transmission unit. The receiving device may include a reception unit, a decoding apparatus and a renderer. The encoding apparatus may be referred to as a video/image encoding apparatus and the decoding apparatus may be referred to as a video/image decoding apparatus. A transmitter may be included in an encoding apparatus. A receiver may be included in a decoding apparatus. A renderer may include a display unit, and a display unit may be composed of a separate device or an external component.

A video source may acquire a video/an image through a process of capturing, synthesizing or generating a video/an image. A video source may include a device of capturing a video/an image and a device of generating a video/an image. A device of capturing a video/an image may include at least one camera, a video/image archive including previously captured videos/images, etc. A device of generating a video/an image may include a computer, a tablet, a smartphone, etc. and may (electronically) generate a video/an image. For example, a virtual video/image may be generated through a computer, etc., and in this case, a process of capturing a video/an image may be replaced by a process of generating related data.

An encoding apparatus may encode an input video/image. An encoding apparatus may perform a series of procedures such as prediction, transform, quantization, etc. for compression and coding efficiency. Encoded data (encoded video/image information) may be output in a form of a bitstream.

A transmission unit may transmit encoded video/image information or data output in a form of a bitstream to a reception unit of a receiving device through a digital storage medium or a network in a form of a file or streaming. A digital storage medium may include various storage media such as USB, SD, CD, DVD, Blu-ray, HDD, SSD, etc. A transmission unit may include an element for generating a media file through a predetermined file format and may include an element for transmission through a broadcasting/communication network. A reception unit may receive/extract the bitstream and transmit it to a decoding apparatus.

A decoding apparatus may decode a video/an image by performing a series of procedures such as dequantization, inverse transform, prediction, etc. corresponding to an operation of an encoding apparatus.

A renderer may render a decoded video/image. A rendered video/image may be displayed through a display unit.

Figure 2:
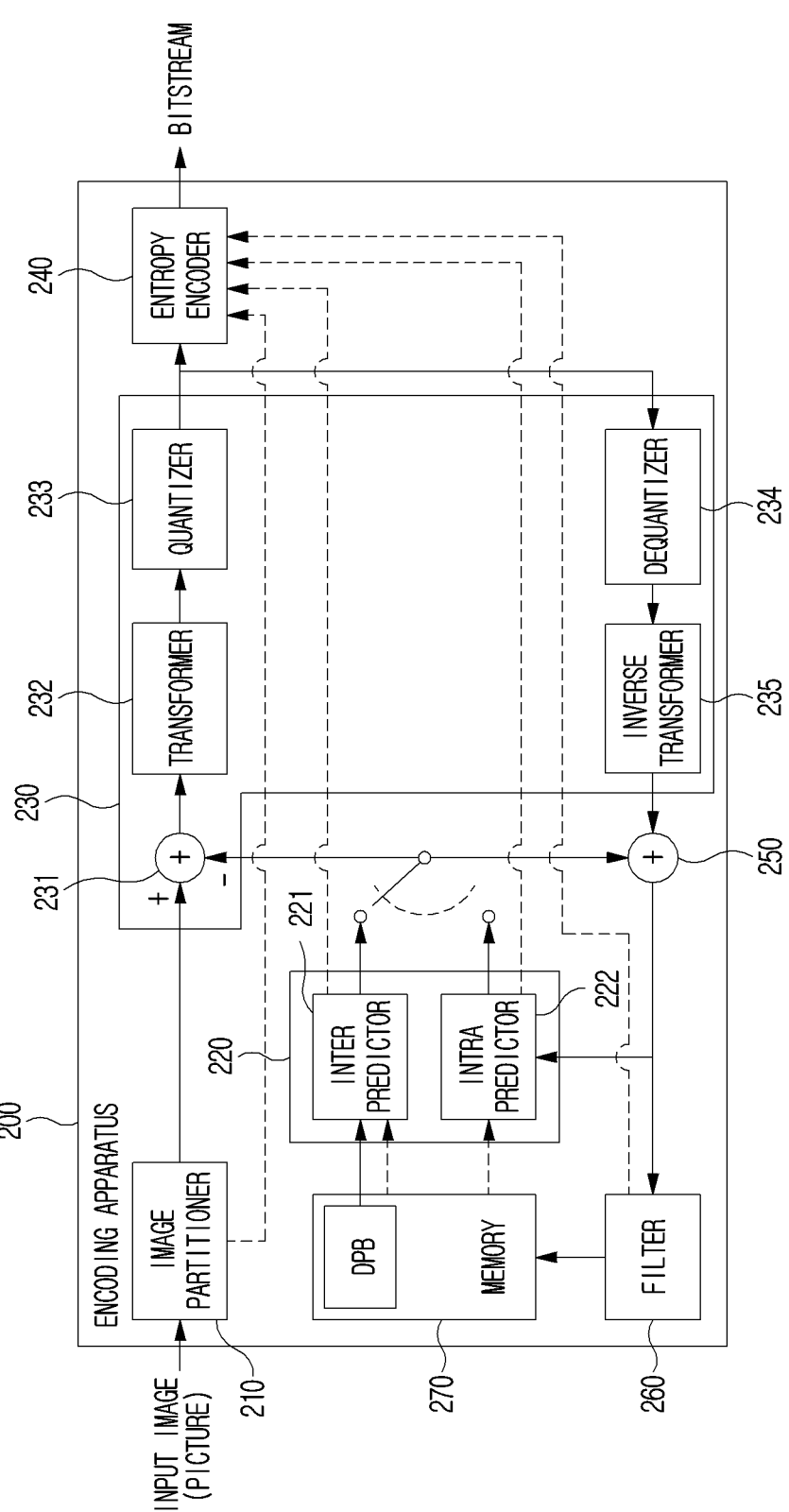
FIG. 2 shows a schematic block diagram of an encoding apparatus to which an embodiment of the present disclosure is applicable and encoding of video/image signals is performed.

FIG. 2 shows a rough block diagram of an encoding apparatus to which an embodiment of the present disclosure may be applied and encoding of a video/image signal is performed.

Referring to FIG. 2, an encoding apparatus 200 may be composed of an image partitioner 210, a predictor 220, a residual processor 230, an entropy encoder 240, an adder 250, a filter 260 and a memory 270. A predictor 220 may include an inter predictor 221 and an intra predictor 222. A residual processor 230 may include a transformer 232, a quantizer 233, a dequantizer 234 and an inverse transformer 235. A residual processor 230 may further include a sub-tractor 231.

An adder 250 may be referred to as a reconstructor or a reconstructed block generator. The above-described image partitioner 210, predictor 220, residual processor 230, entropy encoder 240, adder 250 and filter 260 may be configured by at least one hardware component (e.g., an encoder chipset or a processor) according to an embodiment. In addition, a memory 270 may include a decoded picture buffer (DPB) and may be configured by a digital storage medium. The hardware component may further include a memory 270 as an internal/external component.

An image partitioner 210 may partition an input image (or picture, frame) input to an encoding apparatus 200 into at least one processing unit. As an example, the processing unit may be referred to as a coding unit (CU). In this case, a coding unit may be partitioned recursively according to a quad-tree binary-tree ternary-tree (QTBTTT) structure from a coding tree unit (CTU) or the largest coding unit (LCU).

For example, one coding unit may be partitioned into a plurality of coding units with a deeper depth based on a quad tree structure, a binary tree structure and/or a ternary structure. In this case, for example, a quad tree structure may be applied first and a binary tree structure and/or a ternary structure may be applied later. Alternatively, a binary tree structure may be applied before a quad tree structure. A coding procedure according to this specification may be performed based on a final coding unit that is no longer partitioned. In this case, based on coding efficiency, etc., according to an image characteristic, the largest coding unit may be directly used as a final coding unit, or if necessary, a coding unit may be recursively partitioned into coding units of a deeper depth, and a coding unit with an optimal size may be used as a final coding unit. Here, a coding procedure may include a procedure such as prediction, transform, and reconstruction, etc. described later.

As another example, the processing unit may further include a prediction unit (PU) or a transform unit (TU). In this case, the prediction unit and the transform unit may be divided or partitioned from a final coding unit described above, respectively. The prediction unit may be a unit of sample prediction, and the transform unit may be a unit for deriving a transform coefficient and/or a unit for deriving a residual signal from a transform coefficient.

In some cases, a unit may be used interchangeably with a term such as a block or an area, etc. In a general case, a M×N block may represent a set of transform coefficients or samples consisting of M columns and N rows. A sample may generally represent a pixel or a pixel value, and may represent only a pixel/a pixel value of a luma component, or only a pixel/a pixel value of a chroma component. A sample may be used as a term that makes one picture (or image) correspond to a pixel or a pel.

An encoding apparatus 200 may subtract a prediction signal (a prediction block, a prediction sample array) output from an inter predictor 221 or an intra predictor 222 from an input image signal (an original block, an original sample array) to generate a residual signal (a residual signal, a residual sample array), and a generated residual signal is transmitted to a transformer 232. In this case, a unit that subtracts a prediction signal (a prediction block, a prediction sample array) from an input image signal (an original block, an original sample array) within an encoding apparatus 200 may be referred to as a subtractor 231.

A predictor 220 may perform prediction on a block to be processed (hereinafter, referred to as a current block) and generate a predicted block including prediction samples for the current block. A predictor 220 may determine whether intra prediction or inter prediction is applied in a unit of a current block or a CU. A predictor 220 may generate various information on prediction such as prediction mode informa-tion, etc. and transmit it to an entropy encoder 240 as described later in a description of each prediction mode. Information on prediction may be encoded in an entropy encoder 240 and output in a form of a bitstream.

An intra predictor 222 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. A nondirectional mode may include at least one of a DC mode or a planar mode. A directional mode may include 33 directional modes or 65 directional modes according to a detail level of a prediction direction. However, it is an example, and more or less directional modes may be used according to a configuration. An intra predictor 222 may determine a prediction mode applied to a current block by using a prediction mode applied to a neighboring block.

An inter predictor 221 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neigh-boring block existing in a current picture and a temporal neighboring block existing in a reference picture. A refer-ence picture including the reference block and a reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, an inter predictor 221 may configure a motion information candidate list based on neighboring blocks and generate information indicating which candidate is used to derive a motion vector and/or a reference picture index of the current block. Inter prediction may be per-formed based on various prediction modes, and for example, for a skip mode and a merge mode, an inter predictor 221 may use motion information of a neighboring block as motion information of a current block. For a skip mode, unlike a merge mode, a residual signal may not be trans-mitted. For a motion vector prediction (MVP) mode, a motion vector of a surrounding block is used as a motion vector predictor and a motion vector difference is signaled to indicate a motion vector of a current block.

A predictor 220 may generate a prediction signal based on various prediction methods described later. For example, a predictor may not only apply intra prediction or inter pre-diction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, a sample value within a picture may be signaled based on information on a palette table and a palette index. A prediction signal generated through the predictor 220 may be used to generate a reconstructed signal or a residual signal.

A transformer 232 may generate transform coefficients by applying a transform technique to a residual signal. For example, a transform technique may include at least one of Discrete Cosine Transform (DCT), Discrete Sine Transform (DST), Karhunen-Loeve Transform (KLT), Graph-Based Transform (GBT) or Conditionally Non-linear Transform (CNT). Here, GBT refers to transform obtained from this graph when relationship information between pixels is expressed as a graph. CNT refers to transform obtained based on generating a prediction signal by using all previously reconstructed pixels. In addition, a transform process may be applied to a square pixel block in the same size or may be applied to a non-square block in a variable size.

A quantizer 233 may quantize transform coefficients and transmit them to an entropy encoder 240 and an entropy encoder 240 may encode a quantized signal (information on quantized transform coefficients) and output it as a bitstream. Information on the quantized transform coefficients may be referred to as residual information. A quantizer 233 may rearrange quantized transform coefficients in a block form into an one-dimensional vector form based on coefficient scan order, and may generate information on the quantized transform coefficients based on the quantized transform coefficients in the one-dimensional vector form.

An entropy encoder 240 may perform various encoding methods such as exponential Golomb, context-adaptive variable length coding (CAVLC), context-adaptive binary arithmetic coding (CABAC), etc. An entropy encoder 240 may encode information necessary for video/image reconstruction (e.g., a value of syntax elements, etc.) other than quantized transform coefficients together or separately.

Encoded information (ex. encoded video/image information) may be transmitted or stored in a unit of a network abstraction layer (NAL) unit in a bitstream form. The video/image information may further include information on various parameter sets such as an adaptation parameter set (APS), a picture parameter set (PPS), a sequence parameter set (SPS) or a video parameter set (VPS), etc. In addition, the video/image information may further include general constraint information. Herein, information and/or syntax elements transmitted/signaled from an encoding apparatus to a decoding apparatus may be included in video/image information. The video/image information may be encoded through the above-described encoding procedure and included in the bitstream. The bitstream may be transmitted through a network or may be stored in a digital storage medium. Here, a network may include a broadcasting network and/or a communication network, etc. and a digital storage medium may include various storage media such as USB, SD, CD, DVD, Blu-ray, HDD, SSD, etc. A transmission unit (not shown) for transmitting and/or a storage unit (not shown) for storing a signal output from an entropy encoder 240 may be configured as an internal/external element of an encoding apparatus 200, or a transmission unit may be also included in an entropy encoder 240.

Quantized transform coefficients output from a quantizer 233 may be used to generate a prediction signal. For example, a residual signal (a residual block or residual samples) may be reconstructed by applying dequantization and inverse transform to quantized transform coefficients through a dequantizer 234 and an inverse transformer 235. An adder 250 may add a reconstructed residual signal to a prediction signal output from an inter predictor 221 or an intra predictor 222 to generate a reconstructed signal (a reconstructed picture, a reconstructed block, a reconstructed sample array). When there is no residual for a block to be processed like when a skip mode is applied, a predicted block may be used as a reconstructed block. An adder 250 may be referred to as a reconstructor or a reconstructed block generator. A generated reconstructed signal may be used for intra prediction of a next block to be processed within a current picture, and may be also used for inter prediction of a next picture through filtering as described later. Meanwhile, luma mapping with chroma scaling (LMCS) may be applied in a picture encoding and/or reconstruction process.

A filter 260 may improve subjective/objective image quality by applying filtering to a reconstructed signal. For example, a filter 260 may generate a modified reconstructed picture by applying various filtering methods to a reconstructed picture, and may store the modified reconstructed picture in a memory 270, specifically in a DPB of a memory 270. The various filtering methods may include deblocking filtering, sample adaptive offset, adaptive loop filter, bilateral filter, etc. A filter 260 may generate various information on filtering and transmit it to an entropy encoder 240. Information on filtering may be encoded in an entropy encoder 240 and output in a form of a bitstream.

A modified reconstructed picture transmitted to a memory 270 may be used as a reference picture in an inter predictor 221. When inter prediction is applied through it, an encoding apparatus may avoid prediction mismatch in an encoding apparatus 200 and a decoding apparatus, and may also improve encoding efficiency.

A DPB of a memory 270 may store a modified reconstructed picture to use it as a reference picture in an inter predictor 221. A memory 270 may store motion information of a block from which motion information in a current picture is derived (or encoded) and/or motion information of blocks in a pre-reconstructed picture. The stored motion information may be transmitted to an inter predictor 221 to be used as motion information of a spatial neighboring block or motion information of a temporal neighboring block. A memory 270 may store reconstructed samples of reconstructed blocks in a current picture and transmit them to an intra predictor 222.

Figure 3:
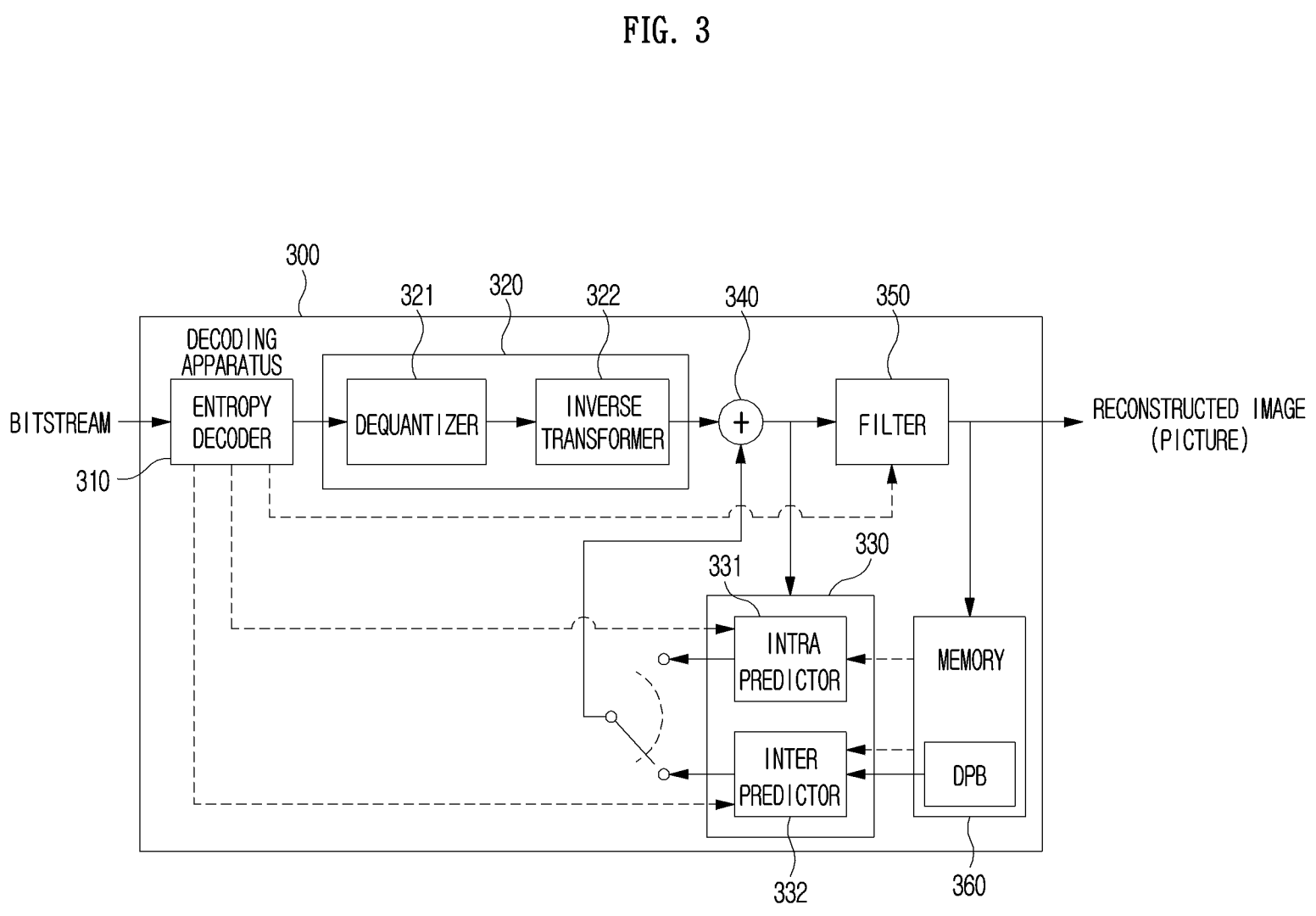

FIG. 3 shows a rough block diagram of a decoding apparatus to which an embodiment of the present disclosure may be applied and decoding of a video/image signal is performed.

Referring to FIG. 3, a decoding apparatus 300 may be configured by including an entropy decoder 310, a residual processor 320, a predictor 330, an adder 340, a filter 350 and a memory 360. A predictor 330 may include an inter predictor 331 and an intra predictor 332. A residual processor 320 may include a dequantizer 321 and an inverse transformer 321.

According to an embodiment, the above-described entropy decoder 310, residual processor 320, predictor 330, adder 340 and filter 350 may be configured by one hardware component (e.g., a decoder chipset or a processor). In addition, a memory 360 may include a decoded picture buffer (DPB) and may be configured by a digital storage medium. The hardware component may further include a memory 360 as an internal/external component.

When a bitstream including video/image information is input, a decoding apparatus 300 may reconstruct an image in response to a process in which video/image information is processed in an encoding apparatus of FIG. 2. For example, a decoding apparatus 300 may derive units/blocks based on block partition-related information obtained from the bitstream. A decoding apparatus 300 may perform decoding by using a processing unit applied in an encoding apparatus. Accordingly, a processing unit of decoding may be a coding unit, and a coding unit may be partitioned from a coding tree unit or the largest coding unit according to a quad tree structure, a binary tree structure and/or a ternary tree structure. At least one transform unit may be derived from a coding unit. And, a reconstructed image signal decoded and output through a decoding apparatus 300 may be played through a playback device.

A decoding apparatus 300 may receive a signal output from an encoding apparatus of FIG. 2 in a form of a bitstream, and a received signal may be decoded through an entropy decoder 310. For example, an entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS) or a video parameter set (VPS), etc. In addition, the video/image information may further include general constraint information. A decoding apparatus may decode a picture further based on information on the parameter set and/or the general constraint information. Signaled/received information and/or syntax elements described later herein may be decoded through the decoding procedure and obtained from the bitstream. For example, an entropy decoder 310 may decode information in a bitstream based on a coding method such as exponential Golomb encoding, CAVLC, CABAC, etc. and output a value of a syntax element necessary for image reconstruction and quantized values of a transform coefficient regarding a residual. In more detail, a CABAC entropy decoding method may receive a bin corresponding to each syntax element from a bitstream, determine a context model by using syntax element information to be decoded, decoding information of a surrounding block and a block to be decoded or information of a symbol/a bin decoded in a previous step, perform arithmetic decoding of a bin by predicting a probability of occurrence of a bin according to a determined context model and generate a symbol corresponding to a value of each syntax element. In this case, a CABAC entropy decoding method may update a context model by using information on a decoded symbol/bin for a context model of a next symbol/bin after determining a context model. Among information decoded in an entropy decoder 310, information on prediction is provided to a predictor (an inter predictor 332 and an intra predictor 331), and a residual value on which entropy decoding was performed in an entropy decoder 310, i.e., quantized transform coefficients and related parameter information may be input to a residual processor 320. A residual processor 320 may derive a residual signal (a residual block, residual samples, a residual sample array). In addition, information on filtering among information decoded in an entropy decoder 310 may be provided to a filter 350. Meanwhile, a reception unit (not shown) that receives a signal output from an encoding apparatus may be further configured as an internal/external element of a decoding apparatus 300 or a reception unit may be a component of an entropy decoder 310.

Meanwhile, a decoding apparatus according to this specification may be referred to as a video/image/picture decoding apparatus, and the decoding apparatus may be divided into an information decoder (a video/image/picture information decoder) and a sample decoder (a video/image/picture sample decoder). The information decoder may include the entropy decoder 310 and the sample decoder may include at least one of dequantizer 321, the inverse transformer 322, the adder 340, the filter 350, the memory 360, the inter predictor 332 and the intra predictor 331.

A dequantizer 321 may dequantize quantized transform coefficients and output transform coefficients. A dequantizer 321 may rearrange quantized transform coefficients into a two-dimensional block form. In this case, the rearrangement may be performed based on coefficient scan order performed in an encoding apparatus. A dequantizer 321 may perform dequantization on quantized transform coefficients by using a quantization parameter (e.g., quantization step size information) and obtain transform coefficients.

An inverse transformer 322 inversely transforms transform coefficients to obtain a residual signal (a residual block, a residual sample array).

A predictor 320 may perform prediction on a current block and generate a predicted block including prediction samples for the current block. A predictor 320 may determine whether intra prediction or inter prediction is applied to the current block based on the information on prediction output from an entropy decoder 310 and determine a specific intra/inter prediction mode.

A predictor 320 may generate a prediction signal based on various prediction methods described later. For example, a predictor 320 may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, information on a palette table and a palette index may be included in the video/image information and signaled.

An intra predictor 331 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. An intra predictor 331 may determine a prediction mode applied to a current block by using a prediction mode applied to a neighboring block.

An inter predictor 332 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. For example, an inter predictor 332 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

An adder 340 may add an obtained residual signal to a prediction signal (a prediction block, a prediction sample array) output from a predictor (including an inter predictor 332 and/or an intra predictor 331) to generate a reconstructed signal (a reconstructed picture, a reconstructed block, a reconstructed sample array). When there is no residual for a block to be processed like when a skip mode is applied, a prediction block may be used as a reconstructed block.

An adder 340 may be referred to as a reconstructor or a reconstructed block generator. A generated reconstructed signal may be used for intra prediction of a next block to be processed in a current picture, may be output through filtering as described later or may be used for inter prediction of a next picture. Meanwhile, luma mapping with chroma scaling (LMCS) may be applied in a picture decoding process.

A filter 350 may improve subjective/objective image quality by applying filtering to a reconstructed signal. For example, a filter 350 may generate a modified reconstructed picture by applying various filtering methods to a reconstructed picture and transmit the modified reconstructed picture to a memory 360, specifically a DPB of a memory 360. The various filtering methods may include deblocking filtering, sample adaptive offset, adaptive loop filter, bilateral filter, etc.

The (modified) reconstructed picture stored in the DPB of the memory 360 can be used as a reference picture in the inter prediction unit 332. A memory 360 may store motion information of a block from which motion information in a current picture is derived (or decoded) and/or motion information of blocks in a pre-reconstructed picture. The stored motion information may be transmitted to an inter predictor 260 to be used as motion information of a spatial neighboring block or motion information of a temporal neighboring block. A memory 360 may store reconstructed samples of reconstructed blocks in a current picture and transmit them to an intra predictor 331.

Herein, embodiments described in a filter 260, an inter predictor 221 and an intra predictor 222 of an encoding apparatus 200 may be also applied equally or correspondingly to a filter 350, an inter predictor 332 and an intra predictor 331 of a decoding apparatus 300, respectively.

FIG. 4 shows an affine model-based inter prediction method performed by a decoding apparatus as an embodiment according to the present disclosure.

Referring to FIG. 4, a candidate list for predicting motion information of the current block may be generated (S400).

Here, the motion information may include at least one of a motion vector, a reference picture index, or inter prediction direction information. Alternatively, motion information may mean any one of a motion vector, reference picture index, or inter prediction direction information.

The candidate list may include one or more affine model-based candidates (hereinafter referred to as affine candidates). The affine candidate may refer to a candidate with a control point vector. The control point vector may refer to the motion vector of the control point for the affine model, and may be defined for each corner position of the block (e.g., the position of at least one of the top-left, top-right, bottom-left, or bottom-right corner).

The affine candidate may include at least one of a spatial candidate, a temporal candidate, or a constructed candidate. Here, the spatial candidate may be derived from a vector of a neighboring block spatially adjacent to the current block (hereinafter referred to as spatial neighboring block), and the temporal candidate may be derived from a vector of a neighboring block temporally adjacent to the current block (hereinafter referred to as temporal neighboring block). Here, the neighboring block may mean a block coded in the affine mode. The vector may mean a control point vector or a motion vector.

The method of deriving the spatial/temporal candidate based on the vector of the spatial/temporal neighboring block will be described in detail with reference to FIG. 5. Meanwhile, the constructed candidate may be derived based on a combination of motion vectors of spatial/temporal neighboring blocks for the current block, where the neighboring blocks may not be blocks coded in the affine mode. Alternatively, at least one neighboring block may be a block coded in the affine mode. This will be described in detail with reference to FIG. 6.

A plurality of affine candidates described above may be arranged in a candidate list based on a predetermined priority. For example, a plurality of affine candidates may be arranged in a candidate list in order of a spatial candidate, a temporal candidate and a constructed candidate. Alternatively, a plurality of affine candidates may be arranged in a candidate list in order of a temporal candidate, a spatial candidate and a constructed candidate. However, it is not limited thereto, and a temporal candidate may be arranged after a constructed candidate. Alternatively, some of constructed candidates may be arranged before a spatial candidate and others may be arranged after a spatial candidate.

The candidate list may further include the subblock-based temporal candidate. Here, the motion information of the temporal candidate may be derived from a collocated block corresponding to the current block, and the motion information may be derived in units of subblocks. The collocated block may be a block belonging to a different picture from the current block (i.e., collocated picture), and may be a block in the same position as the current block or a block in a position shifted by a temporal vector from the position of the current block. The temporal vector may be determined based on the motion vector of the spatial neighboring block of the current block. The spatial neighboring block may refer to a block adjacent to at least one of the left, bottom-left, top, top-right, or top-left of the current block. The temporal vector may be determined using only the neighboring block at the position pre-defined in the encoding/decoding apparatus. For example, the pre-defined position may be the left or top of the current block, or may be the left and top. When there are a plurality of neighboring blocks on the left, a block located at any one of the bottommost, topmost, or center among the plurality of neighboring blocks may be used. When there are a plurality of neighboring blocks at the top, a block located on any one of the leftmost, rightmost, or center among the plurality of neighboring blocks may be used.

In deriving a subblock-based temporal candidate, the current block and/or collocated block may be divided into a plurality of subblocks. Here, the subblock may have the pre-defined size/shape in the encoding/decoding apparatus. For example, the subblock may be expressed as an N×M block, and the N and M values may be integers of 4, 8, or more. The subblock may be square (N=M) or non-square (N>M, N<M). Alternatively, the encoding apparatus may encode and signal information on the size/shape of the subblock, and the decoding apparatus may determine the size/shape of the subblock based on the signaled information. Alternatively, the current block and/or collocated block may be divided into a plurality of subblocks based on a predetermined number. Here, the number may be the pre-defined number in the encoding/decoding apparatus, or may be variably determined based on the block size/shape. Alternatively, the number may be determined based on number information signaled from the encoding apparatus.

Hereinafter, it will be described in detail for a method of deriving motion information of the temporal candidate in units of subblocks. The motion vector of the temporal candidate may be set to a motion vector stored for each subblock of the collocated block. The reference picture index of the temporal candidate may be set to a pre-defined value (e.g., 0) in the encoding/decoding apparatus. Alternatively, the reference picture index of the temporal candidate may be set to the reference picture index of a collocated block or the reference picture index of the top-left subblock among subblocks. Alternatively, like the motion vector, the reference picture index of the temporal candidate may be also set to the reference picture index stored for each subblock.

However, when an unavailable subblock exists among the subblocks belonging to the collocated block, the motion vector of the unavailable subblock may be replaced with the motion vector of an available subblock within the collocated block. Here, the available subblock may refer to a block adjacent to any of the left, right, top, or bottom of the unavailable subblock. Alternatively, the available subblock may refer to a block at a position pre-defined in the encoding/decoding apparatus. For example, the pre-defined position may be the position of the bottom-right subblock within the collocated block, or the position of the subblock including the center position of the collocated block. The above-described subblock-based temporal candidate may be added to the candidate list only when the available subblock exists. Alternatively, the above-described subblock-based temporal candidate may be added to the candidate list only when the subblock at the pre-defined position is available.

The candidate list may further include the candidate with the zero motion vector. The candidate with the zero motion vector may be added to the candidate list after the above-described rearrangement of the affine candidates. Alternatively, the rearrangement may be performed after the candidate with the zero motion vector is added to the candidate list.

Additionally, a plurality of candidates in the candidate list may be rearranged based on a predetermined priority.

For this, the plurality of candidates may be grouped into one or more subgroups. In this case, grouping may be performed on a plurality of candidates, or grouping may be performed on the remaining candidates excluding at least one of the subblock-based temporal candidate or the candidate with the zero motion vector.

The rearrangement may be performed on all of one or more subgroups, or may be performed on only on some subgroups. For example, the rearrangement may not be performed on a subgroup that includes at least one of the subblock-based temporal candidate or the candidate with the zero motion vector. Alternatively, the rearrangement may not be performed on the subgroup to which the candidate with the smallest index (i.e., 0) belongs, but the rearrangement may be performed on the subgroup to which the candidate with the largest index belongs. Conversely, the rearrangement may be performed on the subgroup to which the candidate with the smallest index (i.e., 0) belongs, and the rearrangement may not be performed on the subgroup to which the candidate with the largest index belongs.

The priority for the rearrangement may be determined based on the sample difference between the L0 reference region and the L1 reference region specified by the motion information of each candidate. That is, the candidates within the subgroup may be rearranged from the smallest to the largest sample differences. Here, the L0/L1 reference region may include at least one of the L0/L1 reference block specified by the motion information of each candidate or its neighboring region. The neighboring region may be one or more sample lines located on the left or top of the L0/L1 reference block.

Referring to FIG. 4, the control point vector of the current block may be derived based on the candidate list and the candidate index (S410).

The candidate index may refer to an index encoded to derive the control point vector of the current block. The candidate index may specify one of a plurality of candidates belonging to the candidate list. When an affine candidate is specified by the candidate index, the control point vector of the current block may be derived using the control point vector of the affine candidate.

For example, it is assumed that the type of the affine model of the current block is 4-parameter (i.e., the current block is determined to use two control point vectors). In this case, when the affine candidate specified by the candidate index has three control point vectors, two of the three control point vectors (e.g., a control point vector with Idx=0, 1, or a control point vector with Idx=0, 2) may be selected and set as the control point vectors of the current block. Alternatively, the three control point vectors of the specified affine candidate may be set as the control point vectors of the current block. In this case, the type of the affine model of the current block may be updated to 6-parameter.

Conversely, it is assumed that the type of the affine model of the current block is 6-parameter (i.e., the current block is determined to use three control point vectors). In this case, when the affine candidate specified by the candidate index has two control point vectors, one additional control point vector may be generated, and the two control point vectors of the affine candidate and the additional control point vector may be set as the control point vectors of the current block. The additional control point vector may be derived based on at least one of the two control point vectors of the affine candidate, the position of the block corner corresponding to the two control point vectors, or the size/position information of the current/neighboring block. Alternatively, the two control point vectors of the specified affine candidate may be set as the control point vectors of the current block. In this case, the type of the affine model of the current block may be updated to 4-parameter.

Referring to FIG. 4, the control point vector may be modified based on a predetermined delta motion vector (deltaMV) (S420).

A delta motion vector that minimizes the sample difference between the L0 block and the L1 block of the current block may be determined, and the control point vector may be modified based on the determined delta motion vector.

A plurality of control point vectors for the current block may share the determined delta motion vector. That is, the plurality of control point vectors may be modified based on the same delta motion vector. Alternatively, the delta motion vector may be determined for each of a plurality of control point vectors of the current block. In this case, one of the plurality of control point vectors may have a different delta motion vector from another one.

It will be described in detail for the method of determining the delta motion vector with reference to FIG. 7.

The modification of the control point vector may be selectively performed based on the type of candidate specified by the candidate index among a plurality of candidates included in the candidate list. For example, the modification of the control point vector may be performed only when the type of the candidate is a spatial candidate. The modification of the control point vector may be performed only when the type of candidate is a temporal candidate. The modification of the control point vector may be performed only when the type of the candidate is the constructed candidate. The modification of the control point vector may be performed only when the type of candidate is a spatial candidate or a constructed candidate. The modification of the control point vector may be performed only when the type of the candidate is a spatial candidate or a temporal candidate. The modification of the control point vector may be performed even when the type of candidate is a candidate with a zero motion vector. Alternatively, the modification of the control point vector may be restricted so that it is not performed when the type of candidate is a candidate with a zero motion vector.

The modification of the control point vector may always be performed regardless of the type of the candidate.

The modification of the control point vector may be performed on all or part of the control point vectors of the current block.

Specifically, the control point vector subject to modification may be determined based on the type of the affine model of the current block. That is, when the type of the affine model of the current block is 4-parameter, the modification may be performed on the first and second control point vectors of the current block. When the type of the affine model of the current block is 6-parameter, the modification may be performed on the first, second and third control point vectors of the current block.

Alternatively, the control point vector subject to modification may be determined as the control point vector of the corner position pre-defined in the encoding/decoding apparatus. Here, the pre-defined corner position may refer to at least one of a top-left corner position, a top-right corner position, a bottom-left corner position, or a bottom-right corner position. The number of pre-defined corner positions may be one, two or more.

Alternatively, whether to modify each control point vector may be determined based on the position of the neighboring block coded in the affine mode. For example, when the left neighboring block of the current block is a block coded in the affine mode, modification may not be performed on at least one of the first control point vector or the third control point vector adjacent to the left neighboring block, and modification may be performed on at least one of the the the second control point vector or the fourth control point vector. when the top neighboring block of the current block is a block coded in the affine mode, modification may not be performed on at least one of the first control point vector or the second control point vector adjacent to the top neighboring block, and modification may be performed on at least one of the third control point vector or the fourth control point vector.

Alternatively, the control point vector subject to modification may be determined regardless of the type of the affine model of the current block. For example, even when the type of the affine model of the current block is 4-parameter, modification may be performed on at least three control point vectors among the first control point vector, the second control point vector, the third control point vector, or the fourth control point vector. Alternatively, in this case, the type of the affine model of the current block may be changed to 6-parameter or 8-parameter. Likewise, even when the type of the affine model of the current block is 6-parameter, modification may be performed on the first control point vector, the second control point vector, the third control point vector, and the fourth control point vector. In this case, The type of the affine model of the current block may be changed to 8-parameter.

The control point vector of the current block according to the type of the changed affine model may be stored in the decoding apparatus, and this may be used to determine the affine model of the next block. Alternatively, the control point vector of the current block according to the type of the changed affine model is only used to derive a motion vector in units of subblocks of the current block, and may not be propagated to determine the affine model of the next block.

Of course, the control point vector subject to modification may be determined based on any one of the above-described embodiments, or may be determined based on a combination of two or more embodiments.

Meanwhile, modification of the control point vector may be performed only when at least one of the following conditions is satisfied, or may be performed only when all of the following conditions are satisfied.

[Condition 1] When the L0 reference picture and the L1 reference picture of the current picture are in different directions

[Condition 2] When the distance between the current picture and the L0 reference picture is the same as the distance between the current picture and the L1 reference picture

[Condition 3] When the weights applied to the L0/L1 reference blocks for weighted prediction of the current block are the same

[Condition 4] When affine model-based MMVD (merge mode with motion vector difference) is not applied

[Condition 5] When merge mode is applied (i.e., when merge_flag is 1)

[Condition 6] When a subblock-based temporal candidate (STMVP) is specified by a candidate index

[Condition 7] When CIP mode and/or Geometric Partitioning Mode are not applied

[Condition 8] When reference picture resampling is not applied

The MMVD may refer to a mode in which a motion vector is modified by applying a predetermined motion vector difference (MVD) to a pre-derived motion vector according to an affine model-based merge mode. The CIIP mode may refer to a mode in which an inter prediction block and an intra prediction block is generated by performing inter prediction and intra prediction on the current block, respectively, and a final prediction block of the current block is generated through a weighted sum of the inter prediction block and the intra prediction block. The reference picture resampling may mean changing the spatial resolution of the reference picture for inter prediction. This allows the current picture to refer to a reference picture with a different spatial resolution.

Alternatively, the modification of the control point vector of the current block may be adaptively performed based on at least one of a first flag indicating whether modification is allowed for the control point vector or motion vector of the block coded in the affine mode or a second flag indicating whether modification is applied for the control point vector or motion vector. Here, each of the first flag and the second flag may be signaled from at least one level of video parameter set (VPS), sequence parameter set (SPS), picture parameter set (PPS), picture header (PH), slice header (SH), coding tree unit (CTU), or coding unit (CU).

Alternatively, modification of the control point vector of the current block may be adaptively performed based on at least one of a third flag indicating whether modification is allowed for the motion vector of a block coded in a predetermined inter prediction mode (e.g., skip mode, merge mode, AMVP mode, MMVD, CIIP, GPM, etc.) or a fourth flag indicating whether modification is applied for the motion vector. Here, each of the third flag and the fourth flag may be signaled from at least one level of a video parameter set (VPS), sequence parameter set (SPS), picture parameter set (PPS), picture header (PH), slice header (SH), coding tree unit (CTU), or a coding unit (CU).

Modification of the control point vector may be adaptively performed based on a combination of at least two of the above-described first to fourth flags.

Based on the modified control point vector, the motion vector of the current block may be derived (S430).

The motion vector may be derived in units of subblocks of the current block. For this, the current block may be divided into a plurality of N×M subblocks. Here, the N×M subblock may be non-square (N>M or N<M) or square (N=M). The N and M values may be 2, 4, 8, 16, 32 or more. It will be described in detail for the method of deriving a motion vector in units of subblocks with reference to FIG. 8.

The control point vector modification method described in S420 may be applied in the same/similar manner to modification of the motion vector derived based on the original control point vector of the current block. In this case, modification of the control point vector may be omitted in S420.

Referring to FIG. 4, inter prediction may be performed on the current block using the derived motion vector (S440).

Specifically, the reference block may be specified using the motion vector of the current block. The reference block may be individually specified for each subblock of the current block. The reference block of each sub-block may belong to one reference picture. That is, subblocks belonging to the current block may share one reference picture. Alternatively, the reference picture index may be independently set for each subblock of the current block. The specified reference block may be set as a prediction block of the current block.

Meanwhile, the above-described embodiment describes a method of modifying the control point vector of a block coded in the affine mode, but is not limited to this. That is, the control point vector modification method in the above-described embodiment may be applied equally/similarly to a motion vector derived according to another inter prediction mode pre-defined in the encoding/decoding apparatus (e.g., skip mode, merge mode, AMVP mode, CIIP mode, etc.).

Figure 5:
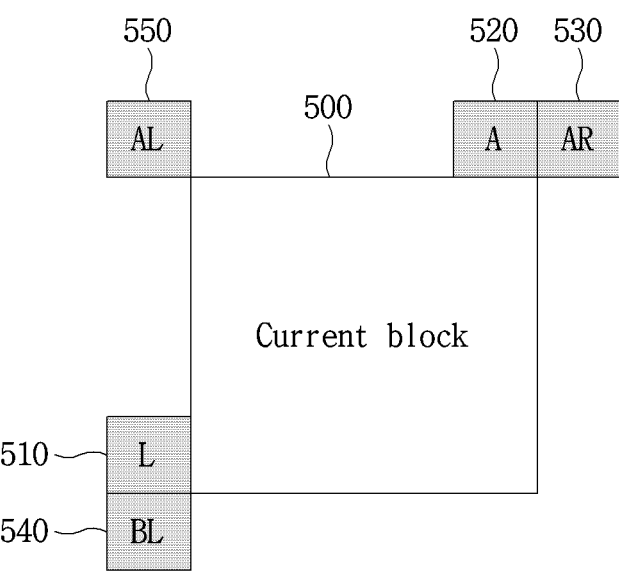
FIG. 5 relates to a method of deriving an affine candidate from a control point vector of a spatial/temporal neighboring block according to an embodiment of the present disclosure.

FIG. 5 is an embodiment according to the present disclosure and relates to a method of deriving an affine candidate from a control point vector of a spatial/temporal neighboring block.

The width and height of the current block 500 are cbW and cbH, respectively, and the position of the current block is (xCb, yCb). The width and height of the spatial neighboring blocks 510 to 550 are nbW and nbH, respectively, and the positions of the spatial neighboring blocks are (xNb, yNb). The spatial neighboring block may include at least one of the left block 510, the bottom-left block 540, the top-right block 430, the top block 420, or the top-left block 450 of the current block. Alternatively, the spatial neighboring block may further include at least one of a block adjacent to the right of the top-left block 450 or a block adjacent to the bottom of the top-left block 450.

A spatial candidate may have N control point vectors (cpMV). Here, N may be an integer of 1, 2, 3, or more. The N value may be determined based on at least one of information on whether the block is decoded in units of subblocks, information on whether the block is coded in the affine mode, or information on the type of affine model (4-parameter or 6-parameter).

For example, when the block is decoded in units of subblocks or is a block coded in the affine mode according to the above information, the block may have two control point vectors. On the other hand, otherwise, the block may not perform the affine model-based prediction.

Alternatively, when the block is a block coded in the affine mode and the type of the affine model is 6-parameter according to the above information, the block may have three control point vectors. On the other hand, otherwise, the block may not perform the affine model-based prediction.

The above-described information may be encoded in the encoding apparatus and may be signaled. Alternatively, all or part of the information may be derived in the decoding apparatus based on the properties of the block. Here, the block may mean the current block or a spatial/temporal neighboring block of the current block. The properties may mean size, shape, position, division type, inter mode, parameters related to residual coefficients, etc. The inter mode may be a pre-defined mode in the decoding apparatus and may refer to merge mode, skip mode, AMVP mode, affine mode, intra/inter combination mode, current picture reference mode, etc. Alternatively, the N value may be derived in the decoding apparatus based on the properties of the block.

In this embodiment, n control point vectors may be expressed as a first control point vector (cpMV[0]), a second control point vector (cpMV[1]), a third control point vector (cpMV[2]), . . . a n-th control point vector (cpMV[n−1]).

As an example, a first control point vector (cpMV[0]), a second control point vector (cpMV[1]), a third control point vector (cpMV[2]) and a fourth control point vector (cpMV[3]) may be a vector corresponding to a position of a top-left sample, a top-right sample, a bottom-left sample and a bottom-right sample of a block, respectively. Here, it is assumed that a spatial candidate has three control point vectors, and three control point vectors may be an arbitrary control point vector selected from a first to n-th control point vector. However, it is not limited thereto, and a spatial candidate may have two control point vectors, and two control point vectors may be an arbitrary control point vector selected from a first to n-th control point vector.

Hereinafter, a method of deriving a control point vector of a spatial candidate is described.

1. When a Boundary of a Current Block does not Border a CTU Boundary'

The first control point vector may be derived based on at least one of a first control point vector of a spatial neighboring block, a predetermined difference value, position information of a current block (xCb, yCb) or position information of a spatial neighboring block (xNb, yNb).

The number of difference values may be 1, 2, 3, or more. The number of difference values may be variably determined based on the above-described properties of the block, or may be a pre-defined value in the encoding/decoding apparatus. The difference value may be defined as a difference value between one of a plurality of control point vectors and another one.

For example, the difference value may include at least one of a first difference value between a second control point vector and a first control point vector, a second difference value between a third control point vector and a first control point vector, a third difference value between a fourth control point vector and a third control point vector or a fourth difference value between a fourth control point vector and a second control point vector.

Specifically, a first control point vector may be derived as in Equation 1 below.

$$cpMvLX\,[0][0] = \qquad\qquad\qquad \text{[Equation 1]}$$
$$(mvScaleHor + dHorX * (xCb - xNb) + dHorY * (yCb - yNb))$$
$$cpMvLX\,[0][1] =$$
$$(mvScaleVer + dVerX * (xCb - xNb) + dVerY * (yCb - yNb))$$

In Equation 1, variable mvScaleHor and mvScaleVer may refer to a first control point vector of a spatial neighboring block, or may refer to a value derived by applying a shift operation by k to a first control point vector. Here, k may be an integer of 1, 2, 3, 4, 5, 6, 7, 8, 9 or more. Variable dHorX and dVerX correspond to a x component and a y component of a first difference value between a second control point vector and a first control point vector, respectively. Variable dHorY and dVerY correspond to a x component and a y component of a second difference value between a third control point vector and a first control point vector, respectively. The above-described variable may be derived as in Equation 2 below.

$$mvScaleHor = CpMvLX\,[xNb][yNb][0][0] << 7 \qquad \text{[Equation 2]}$$
$$mvScaleVer = CpMvLX\,[xNb][yNb][0][1] << 7$$
$$dHorX = (CpMvLX\,[xNb + nNbW - 1][yNb][1][0] -$$
$$CpMvLX\,[xNb][yNb][0][0]) << (7 - \log 2NbW)$$

-continued
$$dVerX = (CpMvLX\,[xNb + nNbW - 1][yNb][1][1] -$$
$$CpMvLX\,[xNb][yNb][0][1]) << (7 - \log 2NbW)$$
$$dHorY = (CpMvLX\,[xNb][yNb + nNbH - 1][2][0] -$$
$$CpMvLX\,[xNb][yNb][2][0]) << (7 - \log 2NbH)$$
$$dVerY = (CpMvLX\,[xNb][yNb + nNbH - 1][2][1] -$$
$$CpMvLX\,[xNb][yNb][2][1]) << (7 - \log 2NbH)$$

A second control point vector may be derived based on at least one of a first control point vector of a spatial neighboring block, a predetermined difference value, position information (xCb, yCb) of a current block, a block size (a width or a height) or position information (xNb, yNb) of a spatial neighboring block. Here, a block size may refer to a size of a current block and/or a spatial neighboring block. The difference value is the same as described in a first control point vector, so a detailed description is omitted here. However, a range and/or the number of difference values used in a process of deriving a second control point vector may be different from those of a first control point vector.

Specifically, a second control point vector may be derived as in Equation 3 below.

$$cpMvLX\,[1][0] = (mvScaleHor + dHorX * \qquad\qquad \text{[Equation 3]}$$
$$(xCb + cbWidth - xNb) + dHorY * (yCb - yNb))$$
$$cpMvLX\,[1][1] = (mvScaleVer + dVerX *$$
$$(xCb + cbWidth - xNb) + dVerY * (yCb - yNb))$$

In Equation 3, variable mvScaleHor, mvScaleVer, dHorX, dVerX, dHorY, and dVerY are the same as described in Equation 1, and a detailed description is omitted here.

A third control point vector may be derived based on at least one of a first control point vector of a spatial neighboring block, a predetermined difference value, position information (xCb, yCb) of a current block, a block size (a width or a height) or position information (xNb, yNb) of a spatial neighboring block. Here, a block size may refer to a size of a current block and/or a spatial neighboring block. The difference value is the same as described in a first control point vector, so a detailed description is omitted here. However, a range and/or the number of difference values used in a process of deriving a third control point vector may be different from those of a first control point vector or a second control point vector.

Specifically, a third control point vector may be derived as in Equation 4 below.

$$cpMvLX\,[2][0] = (mvScaleHor + dHorX * \qquad\qquad \text{[Equation 4]}$$
$$(xCb - xNb) + dHorY * (yCb + cbHeight - yNb))$$
$$cpMvLX\,[2][1] = (mvScaleVer + dVerX *$$
$$(xCb - xNb) + dVerY * (yCb + cbHeight - yNb))$$

In Equation 4, variable mvScaleHor, mvScaleVer, dHorX, dVerX, dHorY, and dVerY are the same as described in Equation 1, and a detailed description is omitted here.

Meanwhile, through the above-described process, a n-th control point vector of a spatial candidate may be derived.

2. When a Boundary of a Current Block Borders a CTU Boundary

The first control point vector may be derived based on at least one of a motion vector (MV) of a spatial neighboring block, a predetermined difference value, position information of a current block (xCb, yCb) or position information (xNb, yNb) of a spatial neighboring block.

The motion vector may be a motion vector of a sub-block positioned at the lowermost of a spatial neighboring block. The sub-block may be positioned at the leftmost, center or rightmost side among a plurality of sub-blocks positioned at the lowermost of a spatial neighboring block. Alternatively, the motion vector may refer to an average value, a maximum value or a minimum value of a motion vector of a sub-block.

The number of difference values may be 1, 2, 3, or more. The number of difference values may be variably determined based on the above-described properties of the block, or may be a pre-defined value in the encoding/decoding apparatus. The difference value may be defined as a difference value between one of a plurality of motion vectors stored in units of subblocks in the spatial neighboring block and another one. For example, the difference value may mean a difference value between the motion vector of the bottom-right subblock of the spatial neighboring block and the motion vector of the bottom-left sub-block of the spatial neighboring block.

For example, a first control point vector may be derived as in Equation 5 below.

$$cpMvLX\,[0][0] = (mvScaleHor + dHorX *$$ $$\hspace{4cm}\text{[Equation 5]}$$
$$(xCb - xNb) + dHorY *(yCb - yNb))$$
$$cpMvLX\,[0][1] = (mvScaleVer + dVerX *$$
$$(xCb - xNb) + dVerY *(yCb - yNb))$$

In Equation 5, variable mvScaleHor and mvScaleVer may refer to a value derived by applying a shift operation by k to the motion vector (MV) or a motion vector (MV) of the above-described spatial neighboring block. Here, k may be an integer of 1, 2, 3, 4, 5, 6, 7, 8, 9 or more.

The variable dHorX and dVerX correspond to a x component and a y component of a predetermined difference value, respectively. Here, a difference value refers to a difference value between a motion vector of a bottom-right sub-block and a motion vector of a bottom-left sub-block within a spatial neighboring block. Variable dHorY and dVerY may be derived based on the variable dHorX and dVerX. The above-described variable may be derived as in Equation 6 below.

$$mvScaleHor = MvLX\,[xNb][yNb + nNbH - 1][0] << 7 \quad\text{[Equation 6]}$$
$$mvScaleVer = MvLX\,[xNb][yNb + nNbH - 1][1] << 7$$
$$dHorX = (MvLX\,[xNb + nNbW - 1][yNb + nNbH - 1][0] -$$
$$MvLX\,[xNb][yNb + nNbH - 1][0]) << (7 - log2NbW)$$

-continued
$$dVerX = (MvLX\,[xNb + nNbW - 1][yNb + nNbH - 1][1] -$$
$$MvLX\,[xNb][yNb + nNbH - 1][1]) << (7 - log2NbW)$$
$$dHorY = -dVerX$$
$$dVerY = dHorX$$

A second control point vector may be derived based on at least one of a motion vector (MV) of a spatial neighboring block, a predetermined difference value, position information of a current block (xCb, yCb), a block size (a width or a height) or position information (xNb, yNb) of a spatial neighboring block. Here, a block size may refer to a size of a current block and/or a spatial neighboring block. For the motion vector and difference value, as described in a first control point vector, a detailed description is omitted here. However, a position, a scope and/or the number of difference values of a motion vector used in a process of deriving a second control point vector may be different from those of a first control point vector.

For example, a second control point vector may be derived as in Equation 7 below.

$$cpMvLX\,[1][0] = (mvScaleHor + dHorX *$$ $$\hspace{4cm}\text{[Equation 7]}$$
$$(xCb + cbWidth - xNb) + dHorY *(yCb - yNb))$$
$$cpMvLX\,[1][1] = (mvScaleVer + dVerX *$$
$$(xCb + cbWidth - xNb) + dVerY *(yCb - yNb))$$

In Equation 7, variable mvScaleHor, mvScaleVer, dHorX, dVerX, dHorY, and dVerY are the same as described in Equation 5, and a detailed description is omitted here.

A third control point vector may be derived based on at least one of a motion vector (MV) of a spatial neighboring block, a predetermined difference value, position information of a current block (xCb, yCb), a block size (a width or a height) or position information (xNb, yNb) of a spatial neighboring block. Here, a block size may refer to a size of a current block and/or a spatial neighboring block. For the motion vector and difference value, as described in a first control point vector, a detailed description is omitted here. However, a position, a scope and/or the number of difference values of a motion vector used in a process of deriving a third control point vector may be different from those of a first control point vector or a second control point vector.

For example, a third control point vector may be derived as in Equation 8 below.

$$cpMvLX\,[2][0] = (mvScaleHor + dHorX *$$ $$\hspace{4cm}\text{[Equation 8]}$$
$$(xCb - xNb) + dHorY *(yCb + cbHeight - yNb))$$
$$cpMvLX\,[2][1] = (mvScaleVer + dVerX *$$
$$(xCb - xNb) + dVerY *(yCb + cbHeight - yNb))$$

In Equation 8, the variables mvScaleHor, mvScaleVer, dHorX, dVerX, dHorY, and dVerY are the same as described in Equation 5, and detailed description will be omitted here. Meanwhile, through the above-described process, the first to Nth control point vectors of the spatial candidate may be derived.

The above-described process of deriving an affine candidate may be performed for each pre-defined spatial neighboring block. A pre-defined spatial neighboring block may include at least one of a left block, a bottom-left block, a top-right block, a top block or a top-left block of a current block.

Alternatively, the process of deriving an affine candidate may be performed respectively per group of the spatial neighboring block. Here, a spatial neighboring block may be classified into a first group including a left block and a bottom-left block and a second group including a top-right block, a top block and a top-left block.

For example, one affine candidate may be derived from a spatial neighboring block belonging to a first group. The derivation may be performed based on a predetermined priority until an available affine candidate is found. The priority may be the order of a left block→a bottom-left block or the reverse order. Whether a corresponding spatial neighboring block in a first group is a block decoded through affine model-based prediction may be determined according to the priority, and a block first decoded through affine model-based prediction may be selected as an affine candidate.

Likewise, one affine candidate may be derived from a spatial neighboring block belonging to a second group. The derivation may be performed based on a predetermined priority until an available affine candidate is found. The priority may be the order of a top-right block→a top block→a top-left block or the reverse order. Whether a corresponding spatial neighboring block in a second group is a block decoded through affine model-based prediction may be determined according to the priority, and a block first decoded through affine model-based prediction may be selected as an affine candidate.

The above-described embodiment may be applied equally/similarly to a temporal neighboring block. Here, a temporal neighboring block belongs to a different picture from a current block, but may be a block at the same position as a current block. A block at the same position may be a block including a position of a top-left sample of a current block, a center position or a position of a sample adjacent to a bottom-right sample of a current block.

Alternatively, a temporal neighboring block may refer to a block at a position shifted by a predetermined disparity vector from the block at the same position. Here, a disparity vector may be determined based on a motion vector of any one of spatial neighboring blocks of a current block described above.

Figure 6:
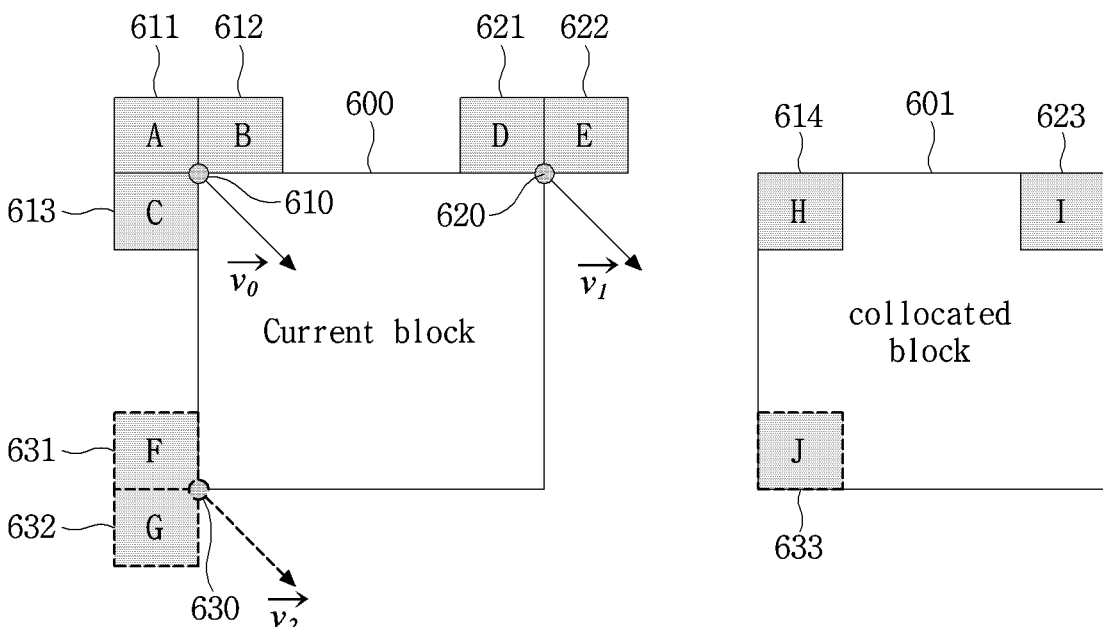
FIG. 6 shows a method of deriving a constructed candidate based on a combination of motion vectors of a spatial/temporal neighboring block according to an embodiment of the present disclosure.

FIG. 6 shows a method of deriving a constructed candidate based on a combination of motion vectors of a spatial/temporal neighboring block according to an embodiment of the present disclosure.

The constructed candidate of the present disclosure may be derived based on a combination of at least two of the control point vectors (hereinafter referred to as control point vector (cpMVCorner[n])) corresponding to each corner position of the current block. Here, n may be 0, 1, 2, or 3.

The control point vector (cpMVCorner[n]) may be derived based on a motion vector of a spatial neighboring block and/or a temporal neighboring block. Here, a spatial neighboring block may include at least one of a first neighboring block (A, B or C) adjacent to a top-left sample of a current block, a second neighboring block (D or E) adjacent to a top-right sample of a current block or a third neighboring block (F or G) adjacent to a bottom-left sample of a current block. As a temporal neighboring block is a block belonging to a different picture from a current block, it may refer to a block at the same position as a current block (hereinafter, referred to as a fourth neighboring block (Col)). Here, a fourth neighboring block may refer to a block (H, I or J) including a position of a top-left sample, a top-right sample or a bottom-left sample of a current block or a block adjacent to a position of a bottom-right sample of a current block.

A first neighboring block may refer to a neighboring block at the top-left (A), the top (B) or the left (C) of a current block. Whether a motion vector of neighboring block A, B and C is available may be determined according to a predetermined priority, and a control point vector may be determined by using a motion vector of an available neighboring block. The availability determination may be performed until a neighboring block with an available motion vector is found. Here, a priority may be in the order of A→B→C. However, it is not limited thereto, and may be in the order of A→C→B, C→A→B, B→A→C.

A second neighboring block may refer to a neighboring block on the top (D) or the top-right (E) of a current block. Likewise, whether a motion vector of neighboring block D and E is available may be determined according to a predetermined priority, and a control point vector may be determined by using a motion vector of an available neighboring block. The availability determination may be performed until a neighboring block with an available motion vector is found. Here, a priority may be in the order of D→E or E→D.

A third neighboring block may refer to a neighboring block on the left (F) or the bottom-left (G) of a current block. Likewise, whether a motion vector of a neighboring block is available may be determined according to a predetermined priority, and a control point vector may be determined by using a motion vector of an available neighboring block. The availability determination may be performed until a neighboring block with an available motion vector is found. Here, a priority may be in the order of G→F or F→G.

For example, a first control point vector (cpMVCorner[0]) may be configured as a motion vector of a first neighboring block, a second control point vector (cpMVCorner[1]) may be configured as a motion vector of a second neighboring block and a third control point vector (cpMVCorner[2]) may be configured as a motion vector of a third neighboring block. A fourth control point vector (cpMVCorner[3]) may be configured as a motion vector of a fourth neighboring block.

Alternatively, a first control point vector may be derived by using a motion vector of at least one of a first neighboring block or a fourth neighboring block, and herein, a fourth neighboring block may be a block (H) including a position of a top-left sample. A second control point vector may be derived by using a motion vector of at least one of a second neighboring block or a fourth neighboring block. Here, a fourth neighboring block may be a block (I) including a position of a top-right sample. A third control point vector may be derived by using a motion vector of at least one of a third neighboring block or a fourth neighboring block. Here, a fourth neighboring block may be a block (J) including a position of a bottom-left sample.

Alternatively, any one of the first to fourth control point vector may be derived based on the other. For example, a second control point vector may be derived by applying a predetermined offset vector to a first control point vector. An offset vector may be a difference vector between a third control point vector and a first control point vector or may be derived by applying a predetermined scaling factor to the difference vector. A scaling factor may be determined based on at least one of a width or a height of a current block and/or a neighboring block.

K constructed candidates (ConstK) according to the present disclosure may be determined through a combination of at least two of the above-described first to fourth control point vectors. The K value may be an integer of 1, 2, 3, 4, 5, 6, 7 or more. The K value may be derived based on information signaled from the encoding apparatus, or may be a pre-defined value in the encoding/decoding apparatus. The information may include information indicating the maximum number of constructed candidates to be included in the candidate list.

Specifically, a first constructed candidate (Const1) may be derived by combining a first to third control point vector. For example, a first constructed candidate (Const1) may have a control point vector as in Table 1 below. Meanwhile, only when reference picture information of a first neighboring block is the same as reference picture information of a second and third neighboring block, there may be a limit that a control point vector is constructed as in Table 1. Here, reference picture information may refer to a reference picture index showing a position of a corresponding reference picture in a reference picture list or may refer to a picture order count (POC) value showing output order.

TABLE 1

| Idx | Control Point Vector |
|-----|----------------------|
| 0   | cpMvCorner[ 0 ]      |
| 1   | cpMvCorner[ 1 ]      |
| 2   | cpMvCorner[ 2 ]      |

A second constructed candidate (Const2) may be derived by combining a first, second and fourth control point vector. For example, a second constructed candidate (Const2) may have a control point vector as in Table 2 below. Meanwhile, only when reference picture information of a first neighboring block is the same as reference picture information of a second and fourth neighboring block, there may be a limit that a control point vector is constructed as in Table 2. Here, reference picture information is as described above.

TABLE 2

| Idx | Control Point Vector |
|-----|----------------------|
| 0   | cpMvCorner[ 0 ]      |
| 1   | cpMvCorner[ 1 ]      |
| 2   | cpMvCorner[ 3 ] + cpMvCorner[ 1 ] − cpMvCorner[ 0 ] cpMvCorner[ 3 ] + cpMvCorner[ 0 ] − cpMvCorner[ 1 ] |

A third constructed candidate (Const3) may be derived by combining a first, third and fourth control point vector. For example, a third constructed candidate (Const3) may have a control point vector as in Table 3 below. Meanwhile, only when reference picture information of a first neighboring block is the same as reference picture information of a third and fourth neighboring block, there may be a limit that a control point vector is constructed as in Table 3. Here, reference picture information is as described above.

TABLE 3

| Idx | Control Point Vector | Control Point Vector |
|-----|----------------------|----------------------|
| 0   | cpMvCorner[0]        | cpMvCorner[0]        |
| 1   | cpMvCorner[3] + cpMvCorner[0] − cpMvCorner[2] | cpMvCorner[2] |
| 2   | cpMvCorner[2]        | cpMvCorner[0] + cpMvCorner[3] − cpMvCorner[2] |

A fourth constructed candidate (Const4) may be derived by combining a second, third and fourth control point vector. For example, a fourth constructed candidate (Const4) may have a control point vector as in Table 4 below. Meanwhile, only when reference picture information of a second neighboring block is the same as reference picture information of a third and fourth neighboring block, there may be a limit that a control point vector is constructed as in Table 4. Here, reference picture information is as described above.

TABLE 4

| Idx | Control Point Vector | Control Point Vector |
|-----|----------------------|----------------------|
| 0   | cpMvCorner[1] + cpMvCorner[2] − cpMvCorner[3] | cpMvCorner[2] |
| 1   | cpMvCorner[1]        | cpMvCorner[3]        |
| 2   | cpMvCorner[2]        | cpMvCorner[3] + cpMvCorner[2] − cpMvCorner[1] |

A fifth constructed candidate (Const5) may be derived by combining a first and second control point vector. For example, a fifth constructed candidate (Const4) may have a control point vector as in Table 5 below. Meanwhile, only when reference picture information of a first neighboring block is the same as reference picture information of a second neighboring block, there may be a limit that a control point vector is constructed as in Table 5. Here, reference picture information is as described above.

TABLE 5

| Idx | Control Point Vector |
|-----|----------------------|
| 1   | cpMvCorner[ 0 ]      |
| 2   | cpMvCorner[ 1 ]      |

A sixth constructed candidate (Const6) may be derived by combining a first and third control point vector. For example, a sixth constructed candidate (Const6) may have a control point vector as in Table 6 below. Meanwhile, only when reference picture information of a first neighboring block is the same as reference picture information of a third neighboring block, there may be a limit that a control point vector is constructed as in Table 6. Here, reference picture information is as described above.

TABLE 6

| Idx | Control Point Vector | Control Point Vector |
|-----|----------------------|----------------------|
| 1   | cpMvCorner[ 0 ]      | cpMvCorner[ 0 ]      |
| 2   | cpMvCorner[ 2 ]      | cpMvCorner[ 1 ]      |

In Table 6, cpMvCorner[1] may be a second control point vector derived based on the first and third control point vector. A second control point vector may be derived based on at least one of a first control point vector, a predetermined difference value or a size of a current/neighboring block. For example, a second control point vector may be derived as in Equation 9 below.

$$cpMvCorner[1][0] =$$
[Equation 9]
$$(cpMvCorner[0][0] << 7) + ((cpMvCorner[2][1] -$$
$$cpMvCorner[0][1]) << (7 + Log2(cbHeight/cbWidth)))$$
$$cpMvCorner[1][1] =$$
$$(cpMvCorner[0][1] << 7) + ((cpMvCorner[2][0] -$$
$$cpMvCorner[0][0]) << 7 + Log2(cbHeight/cbWidth)))$$

In the above-described K constructed candidates (ConstK), a value of K does not limit a position or a priority of a constructed candidate arranged in a candidate list.

In addition, all of the first to sixth constructed candidate may be included in the candidate list or only some of them may be included in a candidate list.

For example, when it is determined that a current block uses three control point vectors, only a constructed candidate generated through a combination of three of a first to fourth control point vector may be used. When it is determined that a current block uses two control point vectors, a constructed candidate generated through a combination of at least two of a first to fourth control point vector may be used or a constructed candidate generated through only a combination of two of a first to fourth control point vector may be used.

Alternatively, only some constructed candidates may be included in a candidate list by considering the maximum number of affine candidates included in a candidate list. Here, the maximum number may be determined based on maximum number information signaled from an encoding apparatus or may be variably determined by considering properties of a current block described above. In this case, a K value of a constructed candidate (ConstK) may refer to a priority inserted into a candidate list.

Meanwhile, when the difference value between two control point vectors belonging to the constructed candidate is less than a predetermined threshold, the constructed candidate may not be inserted into the candidate list. The difference value between the two control point vectors may be divided into a horizontal difference value and a vertical difference value. Here, the horizontal difference value may refer to the difference value between the first control point vector 610 and the second control point vector 620, and the vertical difference value may refer to the difference value between the first control point vector 610 and the third control point vector 630. The threshold may mean 0 or a vector of a pre-defined size in the encoding/decoding apparatus.

Figure 7:
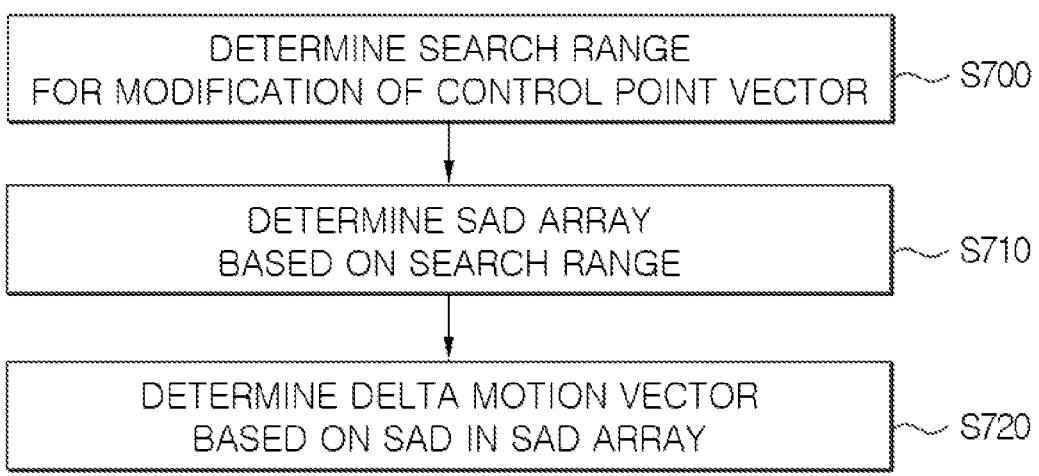
FIG. 7 shows a method for determining a delta motion vector as an embodiment according to the present disclosure.

FIG. 7 shows a method for determining a delta motion vector as an embodiment according to the present disclosure.

In this embodiment, it is assumed that the initial value of the delta motion vector is 0.

Referring to FIG. 7, a search range for modification of the control point vector may be determined (S700).

The search range may be determined as a region that includes at least one of a block with a size of W×H in the reference picture (hereinafter referred to as a reference block) or an adjacent region of the reference block. In this case, the position of the top-left sample of the reference block may be the reference position for search. The search range may be determined for the L0 direction and L1 direction, respectively. The reference block may refer to a block indicated by a control point vector of the current block or a block indicated by a motion vector of the current block. The adjacent region may mean a region extended by K sample lines from the boundary of the reference block. Here, K may be an integer of 1, 2, 3 or more.

The adjacent region may be located in at least one direction of the left, top, right, bottom, top-left, bottom-left, top-right, or bottom-right of the reference block. However, in order to reduce the complexity of the search process, the adjacent region may be located in only some of the above-mentioned directions. For example, it may be restricted to a region adjacent to the left and top of the reference block, or may be restricted to a region adjacent to the right and bottom of the reference block.

The number (K) of sample lines belonging to the adjacent region may be a pre-defined value in the encoding/decoding apparatus, or may be variably determined based on block properties. Here, block properties may mean block size/shape, block position, inter prediction mode, component type, etc. The block position may mean whether the reference block is located on the boundary of a picture or a predetermined fragment region. The fragment region may refer to a tile, a coding tree block column/row, or a coding tree block. For example, based on the block properties, any one of 0, 1, 2, 3, or more sample lines may be selectively used.

The search range may be determined equally for all control point vectors of the current block. Alternatively, the search range may be determined differently depending on the position of the control point vector. In this case, the search range according to the position of the control point vector may be adaptively determined based on the position and/or size of the neighboring block coded in the affine mode. For example, when the left neighboring block of the current block is a block coded in the affine mode, the search range for at least one of the first control point vector or the third control point vector adjacent to the left neighboring block may be smaller than the search range for at least one of the second control point vector or the fourth control point vector. When the top neighboring block of the current block is a block coded in the affine mode, the search range for at least one of the first control point vector or the second control point vector adjacent to the top neighboring block may be smaller than the search range for at least one of the third control point vector or the fourth control point vector.

The search position within the search range may be a position shifted by p in the x-axis direction and q in the y-axis direction from the reference position. For example, when p and q are integers in the range of −1 to 1, the number of search positions in integer pel units within the search range may be up to 9. Alternatively, when p and q are integers in the range of −2 to 2, the number of search positions in integer pel units within the search range may be up to 25. However, it is not limited to this, and p and q may be between integers whose size (absolute value) is greater than 2, and a search may be performed in fractional pel units.

The same search precision may be used regardless of the position of the control point vector. Alternatively, different search precision may be used depending on the position of the control point vector. For example, available search precisions may be 1/16, 1/8, 1/4, 1/2, 1, 2, 4, 8, 16, etc. A high search precision such as 1/16, 1/8 is used for the first control point vector. For the second control point vector, the third control point vector, or the fourth control point vector, a search precision lower than that of the first control point vector, such as ⅛ or ¼, may be used. Alternatively, the search precision of each control point vector may be adaptively determined based on the position and/or size of the neighboring block coded in the affine mode. For example, when the left neighboring block of the current block is a block coded in the affine mode, the search precision for at least one of the first control point vector or the third control point vector adjacent to the left neighboring block may be higher than the search precision for at least one of the second control point vector or the fourth control point vector. When the top neighboring block of the current block is a block coded in the affine mode, the search precision for at least one of the first control point vector or the second control point vector adjacent to the top neighboring block may be higher than the search precision for at least one of the third control point vector or the fourth control point vector.

Hereinafter, for convenience of explanation, it is assumed that the current block has two control point vectors (i.e., first and second control point vectors), the search is performed in integer pel units, and p and q are the integers in the range of −1 to 1.

Referring to FIG. 7, the SAD (sum of absolute difference) array may be determined based on the search range (S710).

The SAD array (sadArray) may include a plurality of SADs calculated for each search position within the search range. Each SAD may be determined as the sample difference between at least two blocks searched in both directions. In this case, the block searched in the L0 direction is called an L0 block, and the block searched in the L1 direction is called an L1 block.

The SAD may be calculated based on all samples belonging to the L0/L1 block, or may be calculated based on some samples within the L0/L1 block.

Here, some samples may refer to subblocks of the L0/L1 block, and at least one of the width or height of the subblock may be half the width or height of the L0/L1 block. That is, the L0 and L1 blocks may have a size of W×H, and the some samples may be the subblock with a size of W×H/2, W/2×H, or W/2×H/2. In this case, when some samples are W×H/2, some samples may be the top subblock (or bottom subblock) within the L0/L1 block. When some samples are W/2×H, some samples may be the left subblock (or right subblock) within the L0/L1 block. When some samples are W/2×H/2, some samples may be the top-left subblock within the L0/L1 block, but are not limited to this.

Alternatively, some samples may be defined as at least one of the even-numbered sample lines or at least one of the odd-numbered sample lines of the L0/L1 block. In this case, the sample line may be a vertical sample line or a horizontal sample line.

Alternatively, some samples may mean samples at the pre-defined positions in the encoding/decoding apparatus. For example, the samples at the pre-defined positions may mean at least one of the top-left sample, the top-right sample, the bottom-left sample, the bottom-right sample, the center sample within the L0/L1 block, the center sample of the sample column/row adjacent to the boundary of the current block, or sample located on the diagonal line in the current block.

Hereinafter, it will be described in detail for the method of determining the SAD array.

Embodiment 1

The SAD array may include one or more SADs calculated through search based on the first control point vector.

Specifically, the first control point vector of the current block may be modified based on a predetermined offset. The modified first control point vector may indicate a position shifted by a predetermined offset from the position indicated by the first control point vector, that is, a search position. The modified first control point vector may be defined as a disparity vector between the search position determined based on the offset and the position of the current block.

The motion vector of the current block may derived based on the modified first and second control point vectors. In this case, the current block may be divided into one or more subblocks, and the motion vector may be derived in units of the subblocks. Each of one or more subblocks belonging to the current block may have an L0/L1 motion vector corresponding to the center position of the subblock. However, it is not limited to this, and an L0/L1 motion vector corresponding to one of the top-left position, bottom-left position, top-right position, or bottom-right position of each subblock may be derived.

Hereinafter, it will be described in detail for a method of deriving a motion vector in units of subblocks based on the modified first and second control point vectors.

Subblock Unit Motion Vector Derivation Method I

In this embodiment, the subblock unit motion vector derivation method described later with reference to FIG. 8 may be applied in the same/similar manner. That is, the motion vector for each sub-block in the current block may be derived using at least one of the modified first control point vector, the second control point vector, the position of the sub-block, or the width of the current block.

For example, the motion vector of each subblock may be derived as in Equation 11. In Equation 11, v0 may refer to the modified first control point vector, and v1 may refer to the second control point vector. (x, y) may represent the position of the subblock, and w may represent the width of the current block.

Subblock Unit Motion Vector Derivation Method II

Unlike subblock unit motion vector derivation method I, the original first control point vector of the current block may be used to derive a motion vector in units of subblocks of the current block. That is, based on the first and second control point vectors previously derived for the current block, a motion vector may be derived in units of subblocks of the current block. For this, the subblock unit motion vector derivation method described later with reference to FIG. 8 may be equally applied.

The motion vector of each subblock may be modified based on the difference between the modified first control point vector and the first control point vector, that is, the offset. For example, the modified motion vector of each subblock may be derived by adding the offset to the motion vector of each subblock. In this case, unlike the subblock unit motion vector derivation method I described above, the process of determining the motion vector in units of the subblocks based on the modified first control point vector and the second control point vector may be omitted, and further, the subblock unit motion vector derivation process may be simplified.

The subblock of the current block may be a 4×4 or 8×8 square block. Alternatively, the subblock of the current block may be a non-square block such as 2×8 or 8×2, or a square or non-square block larger than 8×8. The unit of the subblock may be pre-defined in the encoding/decoding apparatus. Alternatively, the unit of the subblock may be adaptively determined based on the size/shape, block position, inter prediction mode, component type, type of affine model of the current block, or size of the control point vector.

Here, the division into one or more subblocks is for determining the SAD, but this may be set to be the same as the unit of the subblock for deriving the motion vector of the current block in step S430. In this case, the subblock determination method, which will be described later with reference to FIG. 8, may be applied in the same/similar manner, and detailed description will be omitted here. Alternatively, the unit of the subblock for determining the SAD may be determined independently from the unit of the subblock in step S430, and thus may have a different size and/or shape from the subblock in step S430.

The L0 block and L1 block may be specified based on the motion vector in units of the subblocks. The SAD may be calculated based on the sample difference between the specified L0 block and L1 block.

Through the above-described process, the SADs corresponding to the offsets pre-defined in the decoding apparatus, respectively, may be calculated, and at least one of the calculated SADs may be included in the SAD array.

In addition, the SAD array may further include one or more SADs calculated through search based on the second control point vector.

As seen in the search process based on the first control point vector, the second control point vector of the current block may be modified based on a predetermined offset. Based on the modified second control point vector and the first control point vector, a motion vector may be derived in units of subblocks of the current block. The L0 block and L1 block may be specified based on the motion vector in units of the subblocks. The SAD may be calculated based on the sample difference between the specified L0 block and L1 block.

Through the above-described process, the SADs corresponding to the offsets pre-defined in the decoding apparatus, respectively, may be calculated, and at least one of the calculated SADs may be included in the SAD array.

Hereinafter, it will be described in detail for the method for specifying the L0/L1 block.

Based on the motion vector in units of subblocks belonging to the current block, L0/L1 subblocks corresponding to each of the subblocks belonging to the current block may be specified. In this case, the L0 block may be specified as a group of the specified L0 subblocks, and the L1 block may be specified as a group of the specified L1 subblocks.

Alternatively, the L0/L1 block may be specified based on the subblock corresponding to the position of the control point vector to be searched among subblocks belonging to the current block.

For example, when the above-described first control point vector-based search is performed, the L0/L1 block may be specified as the L0/L1 subblock specified by the motion vector of the top-left subblock in the current block. Alternatively, when the above-described second control point vector-based search is performed, the L0/L1 block may be specified as the L0/L1 subblock specified by the motion vector of the top-right subblock in the current block.

Alternatively, the L0/L1 block may be specified based on a subblock corresponding to the position of the control point vector to be searched among subblocks belonging to the current block and at least one neighboring subblock adjacent to the subblock.

For example, when the above-described first control point vector-based search is performed, the L0/L1 block may be specified as a group of L0/L1 subblocks each specified by the motion vector of the top-left subblock in the current block and at least one neighboring subblock adjacent to the top-left subblock. Here, the neighboring subblock may include at least one of a right subblock, a bottom subblock, or a bottom-right subblock adjacent to the top-left subblock of the current block. Meanwhile, the L0/L1 subblock corresponding to the top-left subblock may be specified by the modified first control point vector or the original first control point vector rather than the motion vector corresponding to the center position of the top-left subblock.

When the above-described second control point vector-based search is performed, the L0/L1 block may be specified as a group of L0/L1 subblocks each specified by the motion vector of the top-right subblock in the current block and at least one neighboring subblock adjacent to the top-right subblock. Here, the neighboring subblock may include at least one of a left subblock, a bottom subblock, or a bottom-left subblock adjacent to the top-right subblock of the current block. Meanwhile, the L0/L1 subblock corresponding to the top-right subblock may be specified by the modified second control point vector or the original second control point vector rather than the motion vector corresponding to the center position of the top-right subblock.

Embodiment 2

The SAD array may include one or more SADs calculated through search based on the first control point vector.

Specifically, the first control point vector of the current block may be modified based on a predetermined offset. The modified first control point vector may indicate a position shifted by a predetermined offset from the position indicated by the first control point vector, that is, a search position. The modified first control point vector may be defined as a disparity vector between the search position determined based on the offset and the position of the current block.

The L0/L1 block for calculating the SAD may be specified based on the modified first control point vector. The SAD may be calculated based on the sample difference between the specified L0 block and L1 block.

Through the above-described process, the SADs corresponding to the offsets pre-defined in the decoding apparatus, respectively, may be calculated, and at least one of the calculated SADs may be included in the SAD array.

In addition, the SAD array may further include one or more SADs calculated through search based on the second control point vector.

Likewise, the second control point vector of the current block may be modified based on a predetermined offset. The L0/L1 block for calculating the SAD may be specified based on the modified second control point vector. The SAD may be calculated based on the sample difference between the specified L0 block and L1 block. Through the above-described process, the SADs corresponding to the offsets pre-defined in the decoding apparatus, respectively, may be calculated, and at least one of the calculated SADs may be included in the SAD array.

Hereinafter, it will be described in detail for the method of specifying the L0/L1 block.

The L0/L1 block may have the same width and height as the current block.

Alternatively, the size of the L0/L1 block may be determined based on the size of the subblock corresponding to the position of the control point vector to be searched among subblocks belonging to the current block.

For example, when the first control point vector-based search is performed (i.e., when the control point vector to be searched is the first control point vector), the L0/L1 block may have the same width and height as the top-left subblock of the current block. Alternatively, when the second control point vector-based search is performed (i.e., when the control point vector to be searched is the second control point vector), the L0/L1 block may have the same width and height as the top-right subblock of the current block.

Meanwhile, as seen in Example 1, the current block may be divided into one or more subblocks, and this may be equally applied to Embodiment 2.

Alternatively, the L0/L1 block may have the same size and/or shape as a sub-region composed of some subblocks in the current block. Here, the sub-region may include a subblock of the current block corresponding to the position of the control point vector to be searched and at least one neighboring sub-block.

For example, when the first control point vector-based search is performed, the sub-region may include the top-left subblock of the current block and at least one neighboring sub-block. Here, the neighboring subblock may include at least one of a right subblock, a bottom subblock, or a bottom-right subblock adjacent to the top-left subblock of the current block. Additionally, the neighboring subblock may further include at least one block that is not adjacent to the top-left subblock of the current block. Alternatively, when the second control point vector-based search is performed, the sub-region may include the top-right sub-block of the current block and at least one neighboring subblock. Here, the neighboring subblock may include at least one of a left subblock, a bottom subblock, or a bottom-left subblock adjacent to the top-right subblock of the current block. Additionally, the neighboring subblock may further include at least one block that is not adjacent to the top-right subblock.

As described above, the sub-region for one of the plurality of control point vectors may be configured not to overlap with the sub-region for another one, or may be configured to allow overlap between sub-regions.

Embodiment 3

The SAD array may include one or more SADs calculated through search based on the motion vector in units of subblocks.

The motion vector of the current block may be derived based on the first control point vector and the second control point vector of the current block. In this case, the current block may be divided into one or more subblocks, and the motion vector may be derived in units of the subblocks. This is the same as seen in Embodiment 1, and redundant description will be omitted here.

Specifically, the motion vector of the current block may be modified based on a predetermined offset. The modified motion vector may indicate a position shifted by a predetermined offset from the position indicated by the motion vector of the current block (or the position of the L0/L1 reference block of the current block), that is, a search position. The modified motion vector may be defined as a disparity vector between the search position determined based on the offset and the position of the current block.

The L0/L1 block for calculating the SAD may be specified based on the modified motion vector. The SAD may be calculated based on the sample difference between the specified L0 block and L1 block.

Through the above-described process, the SADs corresponding to the offsets pre-defined in the decoding apparatus, respectively, may be calculated, and at least one of the calculated SADs may be included in the SAD array.

Hereinafter, it will be described in detail for the method of specifying the L0/L1 block.

The L0/L1 subblocks corresponding to the subblocks belonging to the current block may be specified based on the motion vector in units of subblocks of the current block. In this case, the L0 block may be specified as a group of the specified L0 subblocks, and the L1 block may be specified as a group of the specified L1 subblocks.

Alternatively, the L0/L1 block may be specified based on the subblock corresponding to the position of the control point vector for the current block among subblocks belonging to the current block.

For example, when the first control point vector is derived for the current block, the L0/L1 block may be specified as an L0/L1 subblock specified by the motion vector of the top-left subblock of the current block. When the second control point vector is derived for the current block, the L0/L1 block may be specified as an L0/L1 subblock specified by the motion vector of the top-right subblock of the current block.

Alternatively, the L0/L1 block may be specified based on the subblock corresponding to the position of the control point vector for the current block among subblocks belonging to the current block and at least one neighboring block.

For example, when the first control point vector is derived for the current block, the L0/L1 block may be specified as a group of the L0/L1 subblocks specified by the motion vector of the top-left subblock of the current block and at least one neighboring subblock. Here, the neighboring subblock may include at least one of a right subblock, a bottom subblock, or a bottom-right subblock adjacent to the top-left subblock of the current block. Alternatively, the neighboring subblock may further include a block that is not adjacent to the top-left subblock.

When the second control point vector is derived for the current block, the L0/L1 block may be specified as a group of the L0/L1 subblocks specified by the motion vector of the top-right subblock of the current block and at least one neighboring subblock. Here, the neighboring subblock may include at least one of a left subblock, a bottom subblock, or a bottom-left subblock adjacent to the top-right subblock of the current block. Alternatively, the neighboring subblock may further include a block that is not adjacent to the top-right subblock.

Hereinafter, it will be described for the offset applicable to Embodiments 1 to 3.

As seen above, the offset according to the present disclosure may be defined as a disparity vector between the position indicated by the control point vector of the current block and the search position. Alternatively, the offset may be defined as a disparity vector between the position indicated by the motion vector of the current block (or the position of the reference block) and the search position.

The offset may include at least one of a non-directional offset of $(0,0)$ or a directional offset. The directional offset may include an offset for at least one direction of left, right, top, bottom, top-left, top-right, bottom-left, or bottom-right. For example, the directional offset may include at least one of $(-1,0)$, $(0,1)$, $(0,-1)$, $(0,1)$, $(-1,-1)$, $(-1,1)$, $(1,-1)$ or $(1,1)$.

The information on the size and/or direction of the above-described offset may be equally pre-defined in the encoding/decoding apparatus, or may be encoded in the encoding apparatus and signaled to the decoding apparatus. The information may be variably determined based on the above-described block properties. The offset may be defined for the L0 direction and L1 direction, respectively. When the offset in the L0 direction is (p,q), the offset in the L1 direction may be set to (−p,−q).

For example, when p and q are integers in the range of −1 to 1, the offset may be defined as shown in Table 7 below.

TABLE 7

| i | 0 | 1 | 2 | 3 | 4 | 5 | 6 | 7 | 8 |
|---|---|---|---|---|---|---|---|---|---|
| dX[i] | −1 | 0 | 1 | −1 | 0 | 1 | −1 | 0 | 1 |
| dY[i] | −1 | −1 | −1 | 10 | 0 | 0 | 1 | 1 | 1 |

Table 7 defines the offset for determining the search position for each index. However, the index in Table 7 is only for distinguishing offsets and does not limit the position of the offset corresponding to the index. The offsets according to Table 7 may include the non-directional offset described above and eight directional offsets.

In this case, the SAD corresponding to index 0 may be determined based on the position indicated by the control point vector of the current block (or the position of the reference block) and the offset of (−1,−1). Specifically, a position shifted by an offset of (−1,−1) from the position indicated by the L0 control point vector of the current block (or the position of the L0 reference block) may be set as the search position, and the L0 block may be determined based on the search position according to any one of Embodiments 1 to 3. Likewise, the position shifted by an offset of (1,1) from the position indicated by the L1 control point vector of the current block (or the position of the L1 reference block) may be set as the search position, and the L1 block may be determined based on the search position. The SAD of index 0 may be determined by calculating the SAD between the L0 block and the L1 block. Through the above-described process, the SADs with indices 1 to 8 may be determined, and the SAD array including the SADs with indices 0 to 9 may be determined.

Alternatively, among nine offsets pre-defined in the decoding apparatus, only K offsets may be selectively used. Here, K may be any value from 2 to 8. For example, in Table 1, three offsets may be used such as [0,4,8], [1,4,7], [2,4,6], [3,4,5], five offsets may be used such as [0,1,3,4,6,7], [0,1,2,3,4,5], or six offsets may be used such as [0,1,3,4,6,7], [0, 1, 2, 3, 4, 5].

In addition, the above-described first control point vector-based search and second control point vector-based search may be performed sequentially or may be performed simultaneously in parallel. One or more SADs calculated through a search based on the first control point vector and one or more SADs calculated through a search based on the second control point vector may be included in the same SAD array.

The SAD array may be determined by performing only a search based on some of the control point vectors for the current block. In this case, the remaining control point vectors may share the SAD array determined through the search based on some of the control point vectors.

For example, it may be limited to calculating the SAD by performing only a search based on the first control point vector. Alternatively, it may be limited to calculating the SAD by performing only a search based on the first and second control point vectors. Alternatively, it may be limited to calculating the SAD by performing only a search based on the first and third control point vectors.

Search may be performed based on each of the control point vectors for the current block, and the SAD array may be determined for each of the control point vectors.

In addition, the above-described Embodiments 1 to 3 use the SAD between blocks searched in bi-directions, but the method is not limited to this, and this may be replaced with MR-SAD (Mean Removed SAD) as shown in Equation 10 below.

$$MR-SAD = \qquad\qquad\qquad\qquad\text{[Equation 10]}$$
$$\sum |P0 - P1 - diff|, \; diff = \left(\sum |P0| - \sum |P1|\right)/(W \times H)$$

In Equation 10, P0 may mean the sample value of the L0 block, P1 may mean the sample value of the L1 block, and the variable diff may mean the average of the differences between the sample values of the L0 block and the sample values of the L1 block.

Referring to FIG. 7, a delta motion vector may be determined based on one or more SADs belonging to the SAD array (S720).

The SAD with the minimum value may be identified among the SADs belonging to the SAD array. The delta motion vector may be updated based on the offset corresponding to the identified SAD. However, when the SAD with the minimum value is not the SAD corresponding to the non-directional offset of (0, 0), the delta motion vector may be updated.

Alternatively, even when the SAD with the minimum value is not the SAD corresponding to the non-directional offset of (0, 0), the delta motion vector may be updated only when the difference between the SAD with the minimum value and the SAD corresponding to the non-directional offset is greater than a predetermined threshold value. Here, the threshold may be a pre-defined value in the encoding/decoding apparatus, and may be adaptively determined by the size/shape, inter prediction mode, component type, type of affine model of the current block, size of the control point vector, the size of the L0/L1 block, the number of samples in the L0/L1 block used to calculate SAD, etc.

Additionally, a predetermined parameter may be calculated using all or part of the SADs belonging to the SAD array, and the delta motion vector may be re-updated based on the calculated parameter.

Here, the re-update may be to update the delta motion vector in integer pel units to the delta motion vector in fractional pel units. The re-update may be performed only when the size of at least one of the x-component or y-component of the offset corresponding to the identified SAD (i.e., SAD of the minimum value) is less than a predetermined threshold value. Here, the threshold value may be an integer of 1, 2, 3 or more.

The parameter may include at least one of a parameter related to the x-axis direction (dMvX) or a parameter related to the y-axis direction (dMvY). For example, the parameter may be calculated as follows, and for convenience of explanation, it will be described based on Table 7 described above.

The dMvX may be determined based on at least one of sadArray[3], sadArray[4], or sadArray[5]. Here, sadArray [3] may be the SAD corresponding to offset (−1,0), sadArray [5] may be the SAD corresponding to offset (1,0), and sadArray[4] may be the SAD corresponding to offset (0,0).

The dMvY may be determined based on at least one of sadArray[1], sadArray[4], or sadArray[7]. Here, sadArray [1] may be the SAD corresponding to offset (0,−1), and sadArray[7] may be the SAD corresponding to offset (0,1).

Alternatively, in modifying the control point vector, the re-update process for the delta motion vector in fractional pel units may be restricted so that it is not performed.

Figure 8:
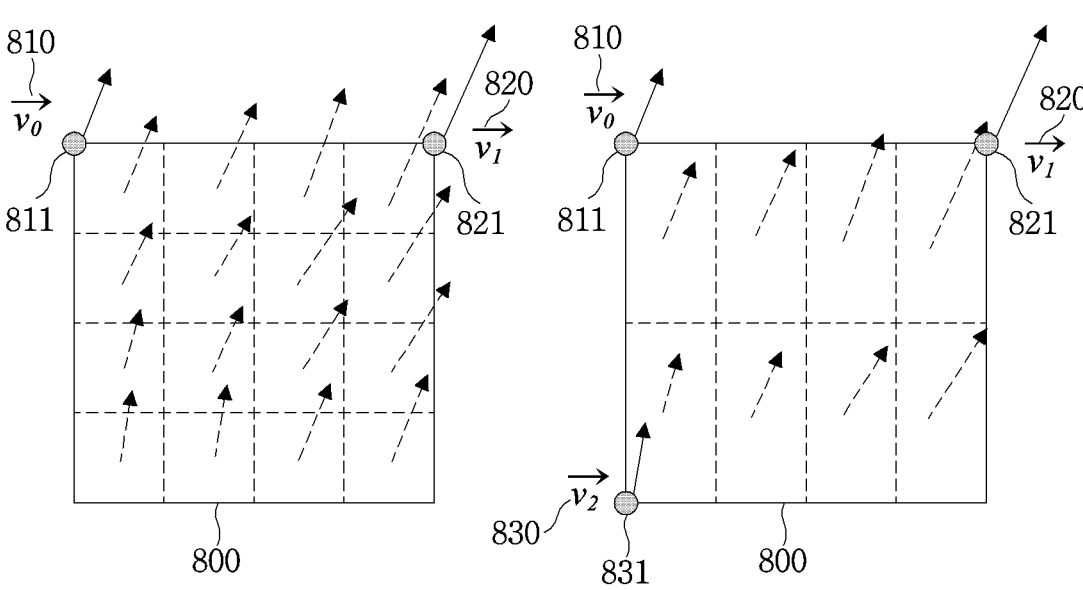
FIG. 8 shows a method of deriving a motion vector in units of subblocks of the current block, as an embodiment of the present disclosure.

FIG. 8 shows a method of deriving a motion vector in units of subblocks of the current block, as an embodiment of the present disclosure.

As described above, a motion vector of a current block may be derived by using a control point vector of a current block. In this case, a current block may be partitioned into a plurality of sub-blocks and a motion vector may be derived in a unit of a sub-block.

The subblock may have the pre-defined size/shape in the encoding/decoding apparatus. For example, the size/shape of the subblock may be square, such as 4×4, 8×8, 16×16, etc., or non-square, such as 2×4, 2×8, 4×8, 4×16, etc. Alternatively, the subblock may be defined as a block where the sum of the width and height is an integer of 8, 12, 16, or more. Alternatively, the subblock may be defined as a block where the product of width and height is an integer of 16, 32, 64, or more.

Alternatively, a size/a shape of a sub-block may be variably derived based on properties of a block described above. For example, when a size of a current block is equal to or greater than a predetermined threshold size, a current block may be partitioned in a unit of a first sub-block (e.g., 8×8, 16×16), and otherwise, a current block may be partitioned in a unit of a second sub-block (e.g., 4×4).

Alternatively, information on the size/shape of the sub-block may be encoded in the encoding apparatus and signaled to the decoding apparatus. The information may indicate at least one of the size or shape of the subblock, and may be signaled at at least one level of sequence, picture, slice, tile, coding tree unit (CTU), or coding unit.

As shown in FIG. 8, the control point representing the current block 800 may include the top-left corner position 811 and the top-right corner position 821. However, the control point is not limited to this, and the control point may include three points: the top-left corner location 811, the top-right corner location 821, and the bottom-left corner location 831, or may further include a plurality of additional points.

When two control points 811 and 821 are used, a motion vector for each sub-block of a current block may be derived by using at least one of a first control point vector 810 corresponding to a first control point 811, a second control point vector 820 corresponding to a second control point 821, a position (x, y) of a sub-block or a size (w or h) of a current block. For example, a motion vector of each sub-block may be derived as in Equation 11 below.

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \qquad \text{[Equation 11]}$$

Meanwhile, when the current block has the modified first control point vector and the third control point vector, the motion vector for each subblock in the current block may be derived using at least one of the modified first control point vector, the third control point vector, the position of the subblock, or the height of the current block.

When three control points are used, a motion vector for each sub-block of a current block may be derived by using at least one of a first control point vector 910 corresponding to a first control point 911, a second control point vector 920 corresponding to a second control point 921, a third control point vector 930 corresponding to a third control point 931, a position (x, y) of a sub-block or a size (w or h) of a current block. In this case, a difference vector between a second control point vector and a first control point vector may be used and a difference vector between a third control point vector and a first control point vector may be used. The difference vector may be calculated for each of a horizontal direction (a x-axis direction) and a vertical direction (a y-axis direction).

Figure 9:
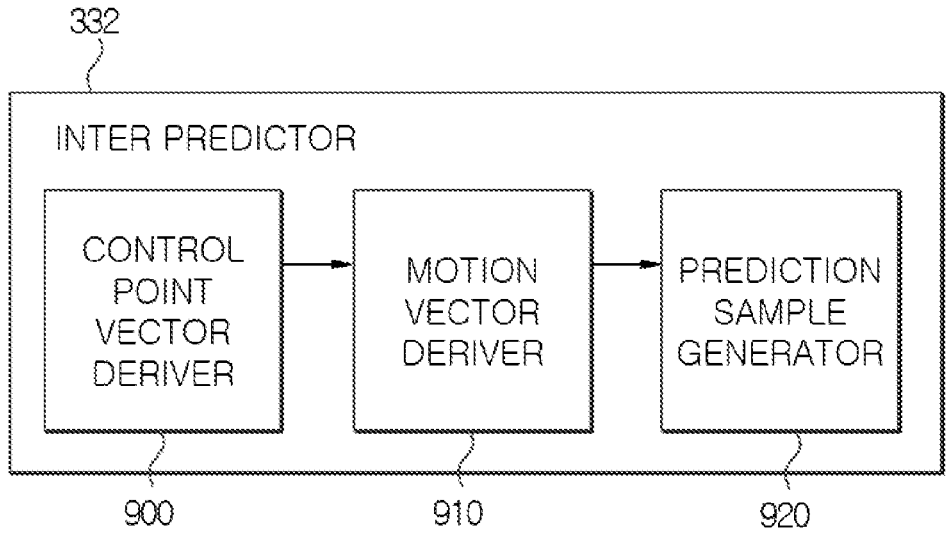
FIG. 9 shows a schematic configuration of an inter predictor 332 that performs inter prediction based on an affine model as an embodiment according to the present disclosure.

FIG. 9 shows a schematic configuration of an inter predictor 332 that performs inter prediction based on an affine model as an embodiment according to the present disclosure.

With reference to FIG. 4, it has been described for the affine model-based inter prediction method performed in the decoding apparatus, and this may be equally performed in the inter predictor 332 of the decoding apparatus. Accordingly, redundant description will be omitted here.

Referring to FIG. 9, the inter predictor unit 332 may include a control point vector deriver 900, a motion vector deriver 910, and a prediction sample generator 920.

The control point vector deriver 900 may generate a candidate list for predicting motion information of the current block. The candidate list may be composed of a plurality of candidates including at least one of an affine candidate, a subblock-based temporal candidate, or a zero motion vector candidate. Additionally, the control point vector deriver 900 may rearrange all or part of the plurality of candidates based on a predetermined priority.

The control point vector deriver 900 may derive the control point vector of the current block based on the candidate list and candidate index.

Additionally, the control point vector deriver 900 may determine a delta motion vector for modifying the control point vector of the current block, and may modify the control point vector of the current block based on the determined delta motion vector. The method for determining the delta motion vector has been described in detail with reference to FIG. 7, and detailed description will be omitted here.

The control point vector deriver 900 may modify all pre-derived control point vectors or may selectively modify only some of the control point vectors. Some of the control point vectors subject to modification may be determined based on the corner position pre-defined in the encoding/decoding apparatus, or may be determined based on the type of the affine model of the current block, the position of the neighboring block coded in the affine mode, etc.

The control point vector deriver 900 may adaptively perform modification of the control point vector based on at least one of the above-described conditions 1 to 8. The control point vector deriver 900 may adaptively perform modification of the control point vector based on at least one of the above-described first to fourth flags.

The motion vector deriver 910 may derive the motion vector of the current block based on the modified control point vector. The motion vector may be derived in units of subblocks of the current block, and for this purpose, the current block may be divided into a plurality of subblocks. The method of deriving a motion vector in units of subblocks of the current block is as described with reference to FIG. 8, and a detailed description will be omitted here.

Alternatively, the motion vector deriver 910 may derive the motion vector of the current block based on the original control point vector, and may modify the motion vector by applying the above-described delta motion vector to the derived motion vector. In this case, the control point vector deriver 900 may not perform a process of modifying the control point vector based on the delta motion vector.

The prediction sample generator 920 may perform inter prediction on the current block using the derived (or modified) motion vector.

FIG. 10 shows an affine model-based inter prediction method performed by an encoding apparatus as an embodiment according to the present disclosure.

Hereinafter, with reference to FIG. 4, it has been described for the affine model-based inter prediction method performed in the decoding apparatus, which may be equally/ similarly applied to the affine model-based inter prediction method performed in the encoding apparatus. Accordingly, redundant description will be omitted here.

Referring to FIG. 10, a candidate list for predicting motion information of the current block may be generated (S1000).

The candidate list may be composed of a plurality of candidates including at least one of an affine candidate, a subblock-based temporal candidate, or a zero motion vector candidate. Additionally, all or part of a plurality of candidates in the candidate list may be rearranged based on a predetermined priority.

Referring to FIG. 10, the control point vector of the current block may be determined based on the candidate list (S1010).

An optimal candidate may be determined among a plurality of candidates belonging to the candidate list, and a control point vector of the current block may be determined based on the determined optimal candidate. In this case, a candidate index specifying the optimal candidate used to determine the control point vector of the current block may be encoded.

Referring to FIG. 10, the control point vector may be modified based on a predetermined delta motion vector (S1020).

A delta motion vector for modifying the control point vector of the current block may be determined, and the control point vector of the current block may be modified based on the determined delta motion vector. The method for determining the delta motion vector has been described in detail with reference to FIG. 7, and detailed description will be omitted here.

All control point vectors derived in step S1010 may be modified, or only some of control point vectors may be selectively modified. Some of the control point vectors subject to modification may be determined based on the corner position pre-defined in the encoding/decoding apparatus, or may be determined based on the type of the affine model of the current block, the position of the neighboring block coded in the affine mode, etc.

The modification of the control point vector may be performed adaptively by considering the type of candidate specified by the candidate index. The modification of the control point vector may be adaptively performed based on at least one of the above-described conditions 1 to 8. In order to adaptively perform modification of the control point vector, at least one of the above-described first to fourth flags may be encoded.

Referring to FIG. 10, the motion vector of the current block may be derived based on the modified control point vector (S1030).

The motion vector may be derived in units of subblocks of the current block, and for this, the current block may be divided into a plurality of subblocks. The method of deriving a motion vector in units of subblocks of the current block is as described with reference to FIG. 8, and a detailed description will be omitted here.

The control point vector modification method described in step S1020 may be applied in the same/similar manner to modifying the motion vector derived based on the original control point vector of the current block. In this case, the control point vector modification process in step S1020 may be omitted.

Referring to FIG. 10, inter prediction may be performed on the current block using the derived (or modified) motion vector (S1040).

A reference subblock corresponding to each subblock of the current block may be specified based on the motion vector, and a prediction block of the subblock within the current block may be obtained based on the specified reference subblock. A bitstream may be generated by encoding the current block based on the prediction block of the current block.

Figure 11:
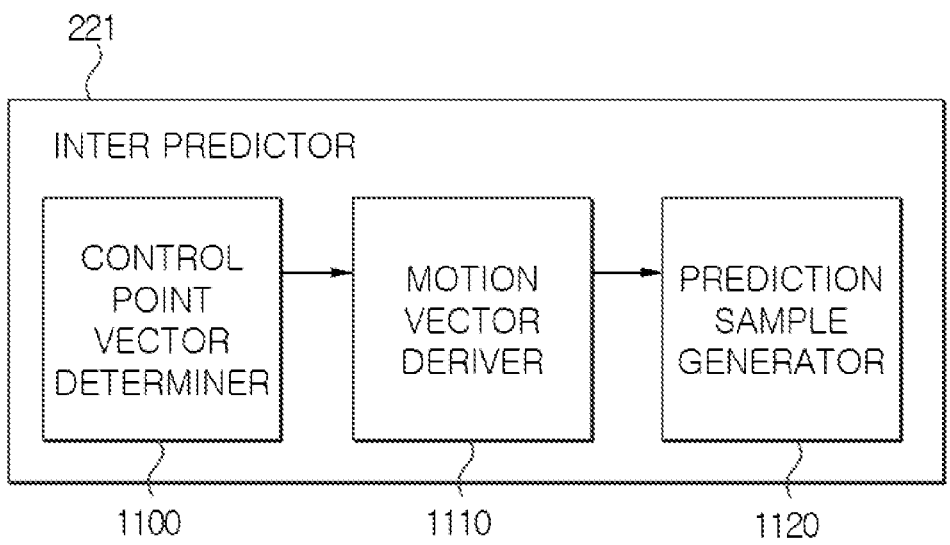
FIG. 11 shows a schematic configuration of an inter predictor 221 that performs inter prediction based on an affine model as an embodiment according to the present disclosure.

FIG. 11 shows a schematic configuration of an inter predictor 221 that performs inter prediction based on an affine model as an embodiment according to the present disclosure.

With reference to FIG. 10, it has been described for the affine model-based inter prediction method performed in the encoding apparatus, and this may be equally performed in the inter predictor 221 of the encoding apparatus. Accordingly, redundant description will be omitted here.

Referring to FIG. 11, the inter predictor 221 may include a control point vector determiner 1100, a motion vector deriver 1110, and a prediction sample generator 1120.

The control point vector determiner 1100 may generate a candidate list for predicting motion information of the current block. The candidate list may be composed of a plurality of candidates including at least one of an affine candidate, a subblock-based temporal candidate, and a zero motion vector candidate. Additionally, the control point vector determiner 1100 may reorder all or part of the plurality of candidates based on a predetermined priority.

The control point vector determiner 1100 may determine an optimal candidate among a plurality of candidates included in the candidate list, and may determine a control point vector of the current block based on the determined optimal candidate. In this case, the entropy encoder 240 may encode a candidate index that specifies the optimal candidate used to determine the control point vector of the current block and insert it into the bitstream.

In addition, the control point vector determiner 1100 may determine a delta motion vector for modifying the control point vector of the current block, and may modify the control point vector of the current block based on the determined delta motion vector. The method for determining the delta motion vector has been described in detail with reference to FIG. 7, and detailed description will be omitted here.

The control point vector determiner 1100 may modify all previously derived control point vectors or may selectively modify only some of the control point vectors. Some of the control point vectors subject to modification may be determined based on the corner position pre-defined in the encoding/decoding apparatus, or may be determined based on the type of the affine model of the current block, the position of the neighboring block coded in the affine mode, etc.

The control point vector determiner 1100 may adaptively perform modification of the control point vector by considering the type of candidate specified by the candidate index.

The control point vector determiner 1100 may adaptively perform modification of the control point vector based on at least one of the above-described conditions 1 to 8. The control point vector determiner 1100 may determine at least one of the above-described first to fourth flags in order to adaptively perform modification of the control point vector. In this case, the entropy encoder 240 may encode at least one of the determined first to fourth flags and insert it into the bitstream.

The motion vector deriver 1110 may derive the motion vector of the current block based on the modified control point vector. The motion vector may be derived in units of subblocks of the current block, and for this, the current block may be divided into a plurality of subblocks. The method of deriving a motion vector in units of subblocks of the current block is as described with reference to FIG. 8, and a detailed description will be omitted here.

Alternatively, the motion vector deriver 1110 may derive the motion vector of the current block based on the original control point vector, and may modify the motion vector by applying the above-described delta motion vector to the derived motion vector. In this case, the control point vector determiner 1100 may not perform a process of modifying the control point vector based on the delta motion vector.

The prediction sample generator 1120 may perform inter prediction on the current block using the derived (or modified) motion vector.

In the above-described embodiment, methods are described based on a flowchart as a series of steps or blocks, but a corresponding embodiment is not limited to the order of steps, and some steps may occur simultaneously or in different order with other steps as described above. In addition, those skilled in the art may understand that steps shown in a flowchart are not exclusive, and that other steps may be included or one or more steps in a flowchart may be deleted without affecting the scope of embodiments of the present disclosure.

The above-described method according to embodiments of the present disclosure may be implemented in a form of software, and an encoding apparatus and/or a decoding apparatus according to the present disclosure may be included in a device which performs image processing such as a TV, a computer, a smartphone, a set top box, a display device, etc.

In the present disclosure, when embodiments are implemented as software, the above-described method may be implemented as a module (a process, a function, etc.) that performs the above-described function. A module may be stored in a memory and may be executed by a processor. A memory may be internal or external to a processor, and may be connected to a processor by a variety of well-known means. A processor may include an application-specific integrated circuit (ASIC), another chipset, a logic circuit and/or a data processing device. A memory may include a read-only memory (ROM), a random access memory (RAM), a flash memory, a memory card, a storage medium and/or another storage device. In other words, embodiments described herein may be performed by being implemented on a processor, a microprocessor, a controller or a chip. For example, functional units shown in each drawing may be performed by being implemented on a computer, a processor, a microprocessor, a controller or a chip. In this case, information for implementation (ex. information on instructions) or an algorithm may be stored in a digital storage medium.

In addition, a decoding apparatus and an encoding apparatus to which embodiment(s) of the present disclosure are applied may be included in a multimedia broadcasting transmission and reception device, a mobile communication terminal, a home cinema video device, a digital cinema video device, a surveillance camera, a video conversation device, a real-time communication device like a video communication, a mobile streaming device, a storage medium, a camcorder, a device for providing video on demand (VoD) service, an over the top video (OTT) device, a device for providing Internet streaming service, a three-dimensional (3D) video device, a virtual reality (VR) device, an argumented reality (AR) device, a video phone video device, a transportation terminal (ex. a vehicle (including an autonomous vehicle) terminal, an airplane terminal, a ship terminal, etc.) and a medical video device, etc., and may be used to process a video signal or a data signal. For example, an over the top video (OTT) device may include a game console, a blu-ray player, an Internet-connected TV, a home theater system, a smartphone, a tablet PC, a digital video recorder (DVR), etc.

In addition, a processing method to which embodiment(s) of the present disclosure are applied may be produced in a form of a program executed by a computer and may be stored in a computer-readable recording medium. Multimedia data having a data structure according to embodiment(s) of the present disclosure may be also stored in a computer-readable recording medium. The computer-readable recording medium includes all types of storage devices and distributed storage devices that store computer-readable data. The computer-readable recording medium may include, for example, a blu-ray disk (BD), an universal serial bus (USB), ROM, PROM, EPROM, EEPROM, RAM, CD-ROM, a magnetic tape, a floppy disk and an optical media storage device. In addition, the computer-readable recording medium includes media implemented in a form of a carrier wave (e.g., transmission via the Internet). In addition, a bitstream generated by an encoding method may be stored in a computer-readable recording medium or may be transmitted through a wired or wireless communication network.

In addition, embodiment(s) of the present disclosure may be implemented by a computer program product by a program code, and the program code may be executed on a computer by embodiment(s) of the present disclosure. The program code may be stored on a computer-readable carrier.

Figure 12:
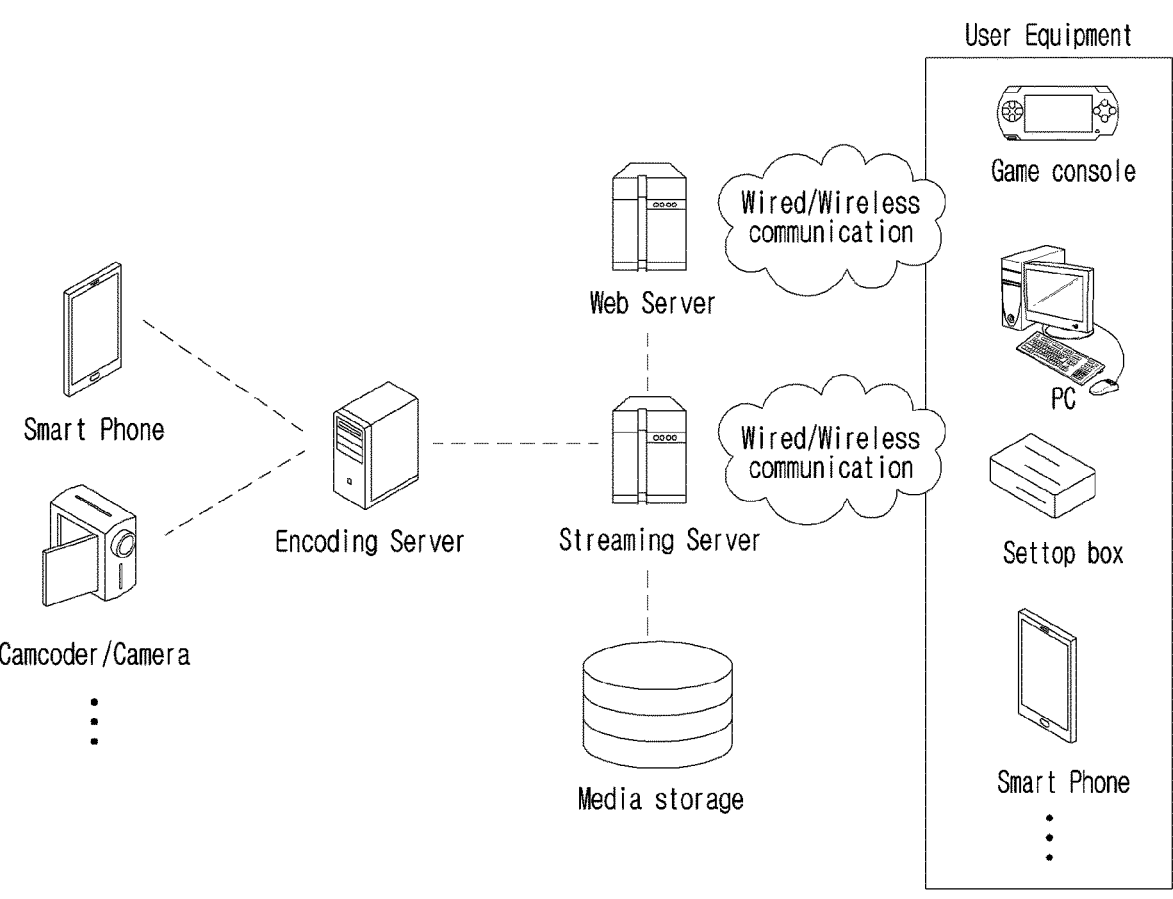
FIG. 12 shows an example of a contents streaming system to which embodiments of the present disclosure may be applied.

FIG. 12 shows an example of a contents streaming system to which embodiments of the present disclosure may be applied.

Referring to FIG. 12, a contents streaming system to which embodiment(s) of the present disclosure are applied may largely include an encoding server, a streaming server, a web server, a media storage, a user device and a multimedia input device.

The encoding server generates a bitstream by compressing contents input from multimedia input devices such as a smartphone, a camera, a camcorder, etc. into digital data and transmits it to the streaming server. As another example, when multimedia input devices such as a smartphone, a camera, a camcorder, etc. directly generate a bitstream, the encoding server may be omitted.

The bitstream may be generated by an encoding method or a bitstream generation method to which embodiment(s) of the present disclosure are applied, and the streaming server may temporarily store the bitstream in a process of transmitting or receiving the bitstream.

The streaming server transmits multimedia data to a user device based on a user's request through a web server, and the web server serves as a medium to inform a user of what service is available. When a user requests desired service from the web server, the web server delivers it to a streaming server, and the streaming server transmits multimedia data to a user. In this case, the contents streaming system may include a separate control server, and in this case, the control server controls a command/a response between each device in the content streaming system.

The streaming server may receive contents from a media storage and/or an encoding server. For example, when contents is received from the encoding server, the contents may be received in real time. In this case, in order to provide smooth streaming service, the streaming server may store the bitstream for a certain period of time.

An example of the user device may include a mobile phone, a smart phone, a laptop computer, a digital broadcasting terminal, a personal digital assistants (PDAs), a portable multimedia players (PMP), a navigation, a slate PC, a Tablet PC, an ultrabook, a wearable device (e.g., a smartwatch, a smart glass, a head mounted display (HMID), a digital TV, a desktop, a digital signage, etc.

Each server in the contents streaming system may be operated as a distributed server, and in this case, data received from each server may be distributed and processed.

The claims set forth herein may be combined in various ways. For example, a technical characteristic of a method claim of the present disclosure may be combined and implemented as a device, and a technical characteristic of a device claim of the present disclosure may be combined and implemented as a method. In addition, a technical characteristic of a method claim of the present disclosure and a technical characteristic of a device claim may be combined and implemented as a device, and a technical characteristic of a method claim of the present disclosure and a technical characteristic of a device claim may be combined and implemented as a method.

The invention claimed is:

1. An image decoding method, comprising:
generating a candidate list for predicting a first motion vector of a current block;
deriving control point vectors of the current block based on a candidate index of the current block and the candidate list, the control point vectors including at least two of a first control point vector corresponding to a top-left corner position of the current block, a second control point vector corresponding to a top-right corner position of the current block, a third control point vector corresponding to a bottom-left corner position of the current block, or a fourth control point vector corresponding to a bottom-right corner position of the current block;
modifying the control point vectors of the current block based on a predetermined delta motion vector;
deriving the first motion vector of the current block based on the modified control point vectors; and
performing inter prediction on the current block using the first motion vector of the current block,
wherein modifying the control point vectors of the current block comprises:
determining a sum of absolute difference (SAD) array based on a search range for modifying the control point vectors, the SAD array including a plurality of SADs for search positions within the search range, an SAD being calculated based on a difference between an L0 block and an L1 block, the L0 and L1 blocks being specified based on at least one of the control point vectors; and
determining the delta motion vector based on the plurality of SADs belonging to the SAD array.

2. The method of claim 1, wherein determining the SAD array comprises:
deriving a modified control point vector by applying a predetermined offset to one of the control point vectors of the current block;
deriving a second motion vector in units of subblocks of the current block based on the modified control point vector and any other of the control point vectors; and
calculating the SAD based on the difference between the L0 block and the L1 block specified based on the derived second motion vector.

3. The method of claim 2, wherein the L0 block and the L1 block are composed of L0 subblocks and L1 subblocks each corresponding to subblocks belonging to the current block.

4. The method of claim 2, wherein the L0 block and the L1 block are specified based on a subblock corresponding to a position of the modified control point vector among subblocks in the current block.

5. The method of claim 2, wherein the L0 block and the L1 block are specified based on a subblock corresponding to a position of the modified control point vector among subblocks in the current block and at least one neighboring subblock adjacent to the subblock.

6. The method of claim 1, wherein determining the SAD array comprises:
deriving a modified control point vector by applying a predetermined offset to one of the control point vectors of the current block; and
calculating the SAD based on the difference between the L0 block and the L1 block specified based on the modified control point vector.

7. The method of claim 1, wherein determining the SAD array comprises:
deriving a second motion vector of the current block based on the control point vector of the current block;
deriving a modified second motion vector by applying a predetermined offset to the second motion vector of the current block; and
calculating the SAD based on the difference between the L0 block and the L1 block specified based on the modified second motion vector.

8. The method of claim 1, wherein modifying the control point vector is adaptively performed by considering a type of a candidate indicated by the candidate index among a plurality of candidates belonging to the candidate list.

9. The method of claim 1, wherein modifying the control point vector is adaptively performed based on at least one of a first flag indicating whether modification is allowed for a control point vector of a block coded in an affine mode or a second flag indicating whether modification is applied to the control point vector.

10. The method of claim 1, wherein a control point vector to be modified among the control point vectors of the current block is determined by considering at least one of a position of a neighboring block coded in an affine mode or a type of an affine model of the current block.

11. The method of claim 1, wherein one of the control point vectors of the current block shares the same delta motion vector with another one of the control point vectors of the current block.

12. The method of claim 1, wherein a type of an affine model for the current block is changed based on a number of the modified control point vectors.

13. An image encoding method, comprising:

generating a candidate list for predicting a first motion vector of a current block;

determining a control point vector of the current block based on the candidate list, the control point vector including at least one of a first control point vector corresponding to a top-left corner position of the current block or a second control point vector corresponding to a top-right corner position of the current block;

modifying the control point vector of the current block based on a predetermined delta motion vector;

deriving the first motion vector of the current block based on the modified control point vector; and performing inter prediction on the current block using the first motion vector of the current block, wherein modifying the control point vectors of the current block comprises:

determining a sum of absolute difference (SAD) array based on a search range for modifying the control point vector, the SAD array including a plurality of SADs for search positions within the search range, an SAD being calculated based on a difference between an L0 block and an L1 block, the L0 and L1 blocks being specified based on the control point vector; and determining the delta motion vector based on the plurality of SADs belonging to the SAD array.

14. A non-transitory computer readable storage medium storing a bitstream generated by an image encoding method according to claim 13.

15. A method of transmitting data for image information, the method comprising:

generating a candidate list for predicting a first motion vector of a current block;

determining a control point vector of the current block based on the candidate list, the control point vector including at least one of a first control point vector corresponding to a top-left corner position of the current block or a second control point vector corresponding to a top-right corner position of the current block;

modifying the control point vector of the current block based on a predetermined delta motion vector;

deriving the first motion vector of the current block based on the modified control point vector;

performing inter prediction on the current block using the first motion vector of the current block;

generating a bitstream by encoding the current block based on a prediction block of the current block generated through the inter prediction; and transmitting the data including the bitstream, wherein modifying the control point vectors of the current block comprises:

determining a sum of absolute difference (SAD) array based on a search range for modifying the control point vector, the SAD array including a plurality of SADs for search positions within the search range, an SAD being calculated based on a difference between an L0 block and an L1 block, the L0 and L1 blocks being specified based on the control point vector; and determining the delta motion vector based on the plurality of SADs belonging to the SAD array.

* * * * *